US008838534B2

(12) United States Patent
Fowler

(10) Patent No.: US 8,838,534 B2
(45) Date of Patent: Sep. 16, 2014

(54) DISTRIBUTED TRANSACTION PROCESSING

(75) Inventor: Matthew Fowler, London (GB)

(73) Assignee: Cloudtran, Inc., Pleasanton, CA (US)

( * ) Notice: Subject to any disclaimer, the term of this patent is extended or adjusted under 35 U.S.C. 154(b) by 150 days.

(21) Appl. No.: 12/718,211

(22) Filed: Mar. 5, 2010

(65) Prior Publication Data

US 2011/0041006 A1 Feb. 17, 2011

(30) Foreign Application Priority Data

Aug. 12, 2009 (GB) .................................. 0914098.9

(51) Int. Cl.
*G06F 7/00* (2006.01)
*G06F 17/00* (2006.01)
*G06F 11/00* (2006.01)
*G06F 15/16* (2006.01)

(52) U.S. Cl.
USPC .............................. 707/615; 707/684; 714/15

(58) Field of Classification Search
USPC .................................... 707/615, 684; 714/15
See application file for complete search history.

(56) References Cited

U.S. PATENT DOCUMENTS

| 6,584,477 | B1 | 6/2003 | Mosher, Jr. | |
|---|---|---|---|---|
| 2002/0194015 | A1* | 12/2002 | Gordon et al. | 705/1 |
| 2002/0194242 | A1* | 12/2002 | Chandrasekaran et al. | 709/101 |
| 2008/0235291 | A1* | 9/2008 | Lahiri et al. | 707/201 |
| 2008/0250272 | A1 | 10/2008 | Barnes et al. | |
| 2011/0035356 | A1* | 2/2011 | Vukojevic | 707/615 |

OTHER PUBLICATIONS

UK Search Report of GB0914098.9 application to New Technology/enterprise Limited. Nov. 16, 2009.

Wilkerson et al. "Distributed Transactions for Google App Engine" Jul. 22, 2009, 36 pps.

Shalom, Nati, "Nati Shalom's Blog, Discussions about middleware and distributed technologies", http://natishalom.typepad.com/nati_shaloms_blog/2009/02/simple-and-cost-effective-entpreisesoa-with-gigaspaces-and-mule.html, Feb. 10, 2010.

http://www.gigaspaces.com/wiki/display/XAP7/GigaSpaces+Read+Modifiers, 4 pages, last edited Dec. 14, 2009, downloaded Oct. 29, 2010.

International Search Report from corresponding PCT/GB/2010/051272 dated Jan. 12, 2011.

Dagan "Oracle Coherence Product Overview" 37 pages.

(Continued)

*Primary Examiner* — Greta Robinson
*Assistant Examiner* — Brian E. Weinrich
(74) *Attorney, Agent, or Firm* — Merchant & Gould P.C.

(57) ABSTRACT

A system and method for processing a distributed transaction for an application are disclosed. Conventionally transactions on critical data (e.g. financial information) are processed using a database architecture whereby a persistent database (typically a redundant disk array) comprises the master record. In cases where large amounts of data need to be accessed but absolute data integrity is less critical, for example search engines, processing is conducted on live in-memory data without all the data being backed up, which can be much faster but data can be lost when processors fail. There have been attempts to use data grid architectures with some backup to persistent stores for more important data but these have either introduced disk access bottlenecks or required manual intervention in the event of failure. Aspects of the invention provide committal of distributed transactions independently of persistent storage which can make the speed advantages of data grid computing available for high volume distributed transactions, without losing the reliability of conventional database systems. The methods, systems and architecture are independent of the nature of the application or data.

59 Claims, 15 Drawing Sheets

(56) References Cited

OTHER PUBLICATIONS

Shalom "The Scalability Revolution: From Dead End to Open Road" Feb. 2007, 27 pages.

Tang "Transaction Management for Reliable Grid Applications" IEEE 2009, 8 pages.

Barnes et al. "Logging Last Resource Optimization for Distributed Transactions in Oracle WebLogic Server" Oracle Corporation, 2010, 6pps.

Oracle Coherence "2 Implement Transactions, Locks, and Concurrency" 8 pages, http://docs.oracle.com/cd/E13924_01/coh.340/e13818/transactionslocks.htm printed Jul. 12, 2012.

Oracle "Coherence Knowledge Base" 12 pages, http://coherence.oracle.com/pages/viewpage.action?pageId=10682656, printed Jul. 12, 2012.

Helland "Life beyond distributed transactions: an apostate's opinion" Amazon.com, pp. 132-141.

Jini Transaction Spec, http://www.jiniworld.com/doc/specs/html/txn-spec.html, printed Aug. 13, 2012.

Async Persistency—Mirror Advanced, pp. 1-5, printed Aug. 13, 2012 http://wiki.gigaspaces.com/wiki/pages/viewpage.action?pageId=53909984.

* cited by examiner

CloudSave Transaction Critical Path

Figure 12

DISTRIBUTED TRANSACTION PROCESSING

The present invention relates to systems and methods for distributed processing of transactions.

In distributed applications, where processing is distributed across nodes in a large system, conventional—i.e. database-oriented—distributed transactions become slow and unreliable. As the number of nodes in the system increases, distributed transactions become increasingly sub-optimal—to the point where conventional three-tier architectures become impractical in large commercial applications.

In-memory data grids, which store data in memory across a grid of processing elements, have been used (for example as caches for application data) to improve the performance of certain types of applications. Products such as the GigaSpaces platform from GigaSpaces Technologies have been developed to simplify development of grid-based applications. However, such applications are typically implemented without distributed transactions due to their complexity and unreliability. This means that consistency of the data in the data grid and any associated persistent storage cannot be ensured, and, where distributed processes fail, manual intervention is required to restore consistency to the data. For most large-scale environments, this reduces the utility of standard relational database systems to such an extent that alternative data storage products and architectures are being developed, which increases the training cost and architecture risk. Also, since such applications typically require changes to application data to be persisted to some form of persistent storage, for example a conventional disk-based relational database, processes can be held up waiting for disk writes to complete, and so the full potential advantages of using an in-memory data grid are typically not realised.

Due to the above problems, data grids have typically not been used in systems requiring high reliability (for example banking systems). In such systems, it is typically required that data changes are persisted to permanent storage, usually a disk-based database system, before transactions are considered complete, leading to low overall performance. Only applications where loss of a few individual transactions is not considered critical (for example search engines or the like), tend to utilise in-memory data grids.

The present invention seeks to alleviate some of these problems.

Accordingly, in a first aspect of the invention, there is provided a method of processing a distributed transaction associated with an application, the application comprising application data stored in an in-memory data grid comprising a plurality of processing elements each having respective associated memory for storing a respective portion of the application data, the method comprising: initiating a distributed transaction by a client connected to the in-memory data grid; executing the distributed transaction by processing elements of the in-memory data grid, the executing comprising performing processing at multiple processing elements of the grid, the processing resulting in changes to be made to application data stored in memory at respective processing elements; transmitting processing result information defining the changes to be made to the application data from respective processing elements to a transaction manager during execution of the distributed transaction, the transaction manager storing transaction data enabling the state of the distributed transaction to be reconstructed at a processing element after an error occurring at the processing element during execution of the distributed transaction; in response to an indication from the client, committing the changes to the in-memory application data at the processing elements, whereby modified application data elements are made available for subsequent access by the application; and updating a persistent copy of application data stored on a persistent storage medium based on the processing result information received by the transaction manager.

In this way, the committing of a distributed transaction in memory at the processing elements can be decoupled from the persisting of application data changes to a persistent storage medium. This can enable transactions to be committed more quickly, since data changes are committed in memory and modified data elements are then immediately available for access by the application, without needing to wait for the changes to be persisted to persistent storage. Instead, changes are persisted preferably asynchronously, typically some time after they have been committed to memory at the processing elements. This can ensure that a persistent copy of the data is (eventually) available, but updates to the persistent copy do not hold up transaction processing. The data stored in memory at the processing elements is thus preferably considered the live or active, up-to-date, consistent, authoritative version of the data at any given time. In other words, the in-memory data at the processing elements preferably provides the system of record for the client and any applications using the data. This is in contrast to conventional database-driven applications, where the database on disk is the system of record, and changes to data elements must be persisted to the disk before the same data elements can be used again to prevent inconsistencies from arising. Furthermore, by storing at the transaction manager transaction data enabling the state of the distributed transaction to be reconstructed at a processing element after an error occurring at the processing element during execution of the distributed transaction, the resilience of the system to failures of individual processing elements can be improved, and hence the overall reliability of distributed transactions can be enhanced.

The term "transaction" as used herein preferably refers to a unit of processing that is treated (for certain purposes) as indivisible, in that the system is arranged to ensure that either all of the processing steps in the transaction are completed and all resulting data changes are applied to the live data, or none of them. Thus, once a transaction has begun, data elements may be accessed and modified by the application code multiple times. After processing is completed, the transaction is either committed or aborted. Committing a transaction means making any changes to data elements final, so that future accesses to those data elements will retrieve the updated values. Aborting a transaction (also referred to as rolling back a transaction) undoes any changes so that the modified data elements revert to the values they had before the start of the transaction. Transactions may be implemented, for example, by applying changes to a copy of data elements and copying these back to the live data when the transaction is committed, or alternatively the live data elements may be modified during the transaction, with rollback information stored separately to allow the original values to be restored if the transaction is aborted. In either case, the live data elements are typically locked during the transaction, and released after the transaction is committed or aborted. At the end of the transaction, the data elements thus become available again for access by the application code, either in modified form (if the transaction was committed) or in unmodified form (if the transaction was aborted). During a transaction, other processes may typically not access data elements being modified in a transaction, to ensure that a consistent view of the data is maintained.

Two types of transactions are distinguished herein; local transactions, modifying data elements in in-memory data areas at individual processing elements, and distributed transactions, which may involve changes at one or more processing elements (possibly by way of one or more local transactions), which are coordinated by a client and/or transaction manager. The term "transaction" herein may refer to either type of transaction depending on context. Committing (aborting) a distributed transaction may involve committing (aborting) multiple individual local transactions. The term "subtransaction" is also used herein to refer to the processing performed at a processing element as part of a distributed transaction, which may involve a local transaction for modifying data as well as other processing, e.g. transaction control processing.

The term "memory" as used herein generally refers to a high-speed, random access (and typically short term) storage medium, whereas "persistent storage" and similar terms refer to comparatively low-speed, but typically longer-term storage media. Typically, memory refers to a non-persistent or volatile storage medium, in particular Random Access Memory (RAM) local to (contained within) a processing device, whereas persistent storage refers to non-volatile, permanent storage, usually disk-based storage, FLASH memory or the like. Nevertheless, the inventors envisage that, in more general terms, the various aspects of the invention set out herein may be provided in any context using two forms of data storage, where one (equivalent to memory) is relatively faster to access, and another (equivalent to persistent storage) is relatively slower to access. Any such two-tier storage environment can benefit from the various transaction management techniques set out herein.

The term "processing element" may refer to a hardware processing device e.g. a server or to a software processing element, e.g. a processing module, process, thread, virtual machine or the like, or to a combination thereof.

The term "in-memory data area" preferably refers to a collection of data elements stored in memory. This may merely be a logical grouping of data elements and need not be a contiguous memory area or related to specific memory addresses.

The term "application" preferably refers to any type of software program or collection of software modules providing some service or functionality to an application user (which may be a person or computer system). The application may include a client initiating a transaction (e.g. a web application server connected to a web front end at a web terminal), and application functionality provided at processing elements in the data grid (e.g. in a service oriented architecture, as described in more detail later).

Preferably, the method comprises reconstructing the state of the distributed transaction at a processing element, after an error at the processing element during execution of the distributed transaction, using information received from the transaction manager. This can in some cases avoid the need to abort the whole distributed transaction after an error occurring at an individual processing element.

The reconstructing step may comprise sending a status query from the processing element to the transaction manager, and receiving a status response indicating the status of the distributed transaction. This may, for example, indicate that the distributed transaction is being committed or aborted, and/or may comprise a commit/abort instruction to the processing element.

Preferably, the information received from the transaction manager used in reconstructing the state of the distributed transaction comprises processing result information previously transmitted to the transaction manager by the processing element. The processing result information may relate to changes that have not yet been committed at the processing element (and hence have not been backed up, see below). In this way, where a processing element fails after completing its processing, the processing state can be restored without having to repeat the processing, and can, if required, be committed immediately, which can enable faster recovery from an error. Accordingly, the method may comprise committing changes to the in-memory application data at the processing element based on the processing result information received from the transaction manager. For efficiency, the status response may include the previously transmitted processing result information.

The reconstructing step may further use information backed up to a backup processing element associated with the processing element. By using both locally backed up information and information received from the transaction manager, failure resilience can be further improved.

The error may comprise non-receipt at the processing element of a commit or abort instruction from the transaction manager. In that case, the information received from the transaction manager for use in reconstructing the transaction state may include a status indication indicating the status of the distributed transaction, or a transaction control instruction such as a commit or abort instruction. The processing element may then continue processing as normal.

Alternatively or additionally, the error may comprises a failure of the processing element (for example a process or system crash, power failure, hardware failure, or the like), the reconstructing step then preferably comprising switching the processing for the processing element to a backup processing element, and reconstructing the state of the transaction at the backup processing element, preferably using one or more of: transaction status information received from the transaction manager; processing result information received from the transaction manager; and application state previously backed up to the backup processing element. In this way, the distributed transaction can be completed despite a serious failure (which in conventional systems would typically result in the transaction being aborted).

Preferably, the processing result information is transmitted from respective processing elements before the changes are committed at the processing elements. Preferably, updating of the persistent copy of application data and committing of changes at the processing elements occur independently, preferably asynchronously.

The term "asynchronous" as used herein preferably indicates that two processes are independent of each other, and in particular, that one process does not have to wait for the other process to reach a defined state (for example it does not have to wait for the other process to finish) before it can start, continue or complete. In other words, the processes are not synchronised.

Preferably, under normal processing conditions, the persistent copy of application data is updated after committing the changes at the processing elements (since the persistent update is typically slower, but the committing at the processing elements is not dependent on completion of the persistent update).

The method preferably comprises, in response to the commit indication received at the transaction manager from the client, transmitting a commit acknowledgement to the client indicating that the distributed transaction is to be committed or is deemed committed, preferably whereby the client treats the transaction as committed after receiving the commit acknowledgement. Advantageously, the transmission of the acknowledgement occurs asynchronously with one or (preferably) both of the committing of changes at the processing elements and the updating of the persistent copy of application data at the persistent storage medium. The transmission of the acknowledgement may occur before one or both of the committing and updating steps. In this way, the client can resume processing without waiting for the committing and/or updating steps to complete, further improving the responsiveness of the system.

In a further aspect of the invention, there is provided a method of processing a distributed transaction associated with an application, the application comprising application data stored in an in-memory data grid comprising a plurality of processing elements each having respective memory for storing a respective portion of the application data, the method comprising: initiating a distributed transaction by a client connected to the in-memory data grid; executing the distributed transaction by processing elements of the in-memory data grid, the executing comprising performing processing at least two processing elements of the grid, the processing resulting in changes to be made to application data stored in memory at respective processing elements; committing the distributed transaction, the committing comprising committing the changes to the in-memory application data at each of the at least two processing elements; and updating a persistent storage medium based on the changes made to the application data at the processing elements.

Updating of the persistent storage medium is preferably performed after the transaction has been committed, preferably after the changes to the in-memory application data have been committed at each processing element. Thus, update to the persistent storage is independent of the commit processing, and a transaction is deemed committed once the in-memory data grid is updated, before (possibly long before) the persistent storage is updated (as discussed above). Accordingly, the committing may be performed in response to a commit instruction received from the client, the method preferably comprising transmitting an acknowledgement that the transaction is deemed committed prior to updating the persistent storage medium.

Preferably, the method comprises, after performing processing at a processing element of the grid, transmitting processing results specifying the changes to be made to the application data at the processing element to a transaction manager. The processing results may, for example, specify the addition, deletion, or modification of one or more data elements.

In a further aspect of the invention, there is provided a method of processing a distributed transaction associated with an application, the application comprising application data stored in an in-memory data grid comprising a plurality of processing elements each having respective associated memory for storing a respective portion of the application data, the method comprising: initiating a distributed transaction by a client connected to the in-memory data grid; executing the distributed transaction by processing elements of the in-memory data grid, the executing comprising performing processing at multiple processing elements of the grid, the processing resulting in changes to be made to application data stored in memory at respective processing elements; transmitting processing result information defining the changes to be made to the application data from respective processing elements to a transaction manager; in response to an indication from the client, committing the changes to the in-memory application data at the processing elements, whereby modified application data elements are made available for subsequent access by the application; asynchronously with the committing step, updating a persistent copy of application data stored on a persistent storage medium based on the processing result information received by the transaction manager.

The method preferably comprises transmitting an acknowledgement to the client that the distributed transaction is to be or is deemed to be committed asynchronously with, preferably prior to, one or both of the committing step and the updating step. The persistent copy is preferably updated after the changes are committed at the processing elements. The changes made to application data at processing elements may comprise first changes to one or more data elements stored in memory at the processing elements, the method comprising executing a subsequent transaction involving second changes to one or more of the previously modified data elements prior to updating the persistent storage medium based on the first changes. The processing result information is preferably transmitted before the changes are committed at the processing elements.

By providing a transaction manager which receives processing results, update of the persistent storage medium can be simplified and decoupled from the updates to the in-memory data stored at the processing elements. To reduce data transmissions, the method may comprise collecting processing results relating to multiple calls to a processing element during the distributed transaction, and transmitting the collected processing results to the transaction manager as a group.

The method may comprise transmitting a registration message from a processing element to the transaction manager, and registering the processing element as a participant in the distributed transaction at the transaction manager in response to the message, the message preferably including the processing results. Thus, only a single message may be required to both register the processing element and transmit its processing results. Reducing the transmissions between components of the system can not only improve efficiency but also reduce potential points of failure in the system.

The method preferably comprises, in response to a commit instruction received at the transaction manager, transmitting a commit message to each processing element registered at the transaction manager as a participant in the distributed transaction.

Advantageously, the method comprises storing the processing results received from processing elements in a buffer associated with the transaction manager. The buffer is preferably held in memory associated with the transaction manager. The persistent storage medium is preferably updated based on information stored in the buffer. The transaction manager and buffer can thus serve to decouple the transaction commit processing in the data grid from the persistent storage update.

The method may comprise reconstructing the state of the distributed transaction at a processing element after a failure at the processing element during execution of the distributed transaction using information received from the transaction manager, as set out above.

The method may comprise, after receiving at the transaction manager a notification from a processing element indicating that the processing element has recovered from a failure, transmitting processing results previously received from the processing element and stored in the buffer to the processing element. In this way, the system can be more resilient to failure of individual processing elements. For further resilience, one or more, preferably each of the processing elements may each be associated with a primary processing device and one or more backup processing devices. In response to failure of a primary processing device, processing for a processing element is preferably switched to an associated backup processing device, and a notification may be transmitted to the transaction manager indicating recovery from a failure.

Preferably, performing processing at a processing element comprises executing a local transaction at the processing element, and committing the local transaction in response to a commit message received from the transaction manager. By using local transactions at the processing elements the distributed transaction can be managed more effectively.

The method may comprise querying the transaction manager by a processing element to determine the distributed transaction status if no commit or abort message is received within a specified time limit, and transmitting a commit or abort message to the processing element in response to the query. In this way, the transaction manager need not wait for explicit acknowledgement of commit/abort instructions to processing elements.

Each processing element preferably comprises: a managed data area for storing application data; and code for performing processing using data stored in the managed data area. The term "managed data area" preferably refers to a collection of data elements managed through a data interface. This interface may, for example, collect processing result information defining any changes made to data elements through the data interface, and may implement local transactions for accessing the data.

Code stored at processing elements may implement one or more services in a service-oriented architecture, and/or may implement a messaging or event-driven application interface.

Preferably, the method comprises backing up the managed data area to one or more backup processing elements, preferably wherein the backup is updated when a local transaction is committed. By updating the transaction when a local transaction is committed (rather than, for example, after each individual change to a data element), backup message traffic to the backup processing elements may be reduced, improving overall efficiency.

Advantageously, the processing elements may be software processing elements, preferably virtual machines, arranged to run on processing devices (e.g. grid servers in the data grid). Two or more software processing elements may be arranged to run on a single processing device. In this way, the assignment of processing elements (with their associated in-memory data) to hardware processing devices may be varied. This can allow scaling of the application. For example, the method may comprise, in response to a change in processing load at one or more processing devices, modifying the assignment of software processing elements to processing devices.

The method preferably comprises partitioning the application data across different processing elements based on content of the data. For example, entities in the application data may be grouped semantically and/or based on relationships between the entities and/or based on application functionality associated with the entities, and different entity groups may be assigned to different processing elements. This can ensure that functionally or semantically related data is stored at the same processing element, reducing the need for access to externally held data when a given function is carried out at a processing element, and thus improving efficiency.

The method preferably comprises selecting a data field associated with a data entity in the application data as a key, partitioning the application data into partitions based on values of the key; and assigning data partitions to processing elements of the data grid. In this way data sets which are too large for storage at an individual processing element can be partitioned, and subsequently accessed, efficiently. A data access request or service call specifying a key value is then preferably routed to one of a plurality of processing elements in dependence on the key value. The key may be associated with a group of related entities (e.g. functionally/semantically related entities as discussed above). Thus, functional and key-based partitioning may be combined.

Updating the persistent storage medium preferably comprises processing the sets of processing results by a plurality of concurrent update processes, the method preferably further comprising identifying dependencies between sets of processing results stored in the buffer of the transaction manager, and processing the sets of processing results by the plurality of concurrent update processes in an order based on identified dependencies. This can help ensure correct ordering when persisting data and hence maintain consistency of the persistently stored application data. Dependencies may be identified when multiple sets of processing results, corresponding to multiple transactions, refer to the same data elements, in particular when the processing results specify changes to be made to the same data elements.

Multiple persistence media may be used. Preferably, the persist processing is first of all split by target persistence device—e.g. if more than one database is involved, there will be no dependencies between saved records in transactions across the different databases. Secondly, multiple persistence threads may then operate per persistence device, to improve performance. The system preferably only allows a given distributed transaction to start persisting if it has no identified dependencies on transactions committed earlier. If there are any, the transaction manager queues them waiting for the earlier transactions on which the given transaction is dependent to finish persisting.

In a further aspect of the invention, there is provided a method of processing a transaction, comprising: initiating a transaction by a client; performing processing at a processing element connected to the client, the processing element storing a plurality of data elements in a data area in memory, the processing resulting in changes to one or more of the data elements stored in the in-memory data area; transmitting processing result information specifying the changes to the data elements from the processing element to a transaction manager; receiving an instruction from the client to commit the transaction; committing the changes to the in-memory data area at the processing element, whereby modified data elements are made available for access by other transactions; and updating a persistent storage medium storing persistent copies of the data elements based on the processing result information received by the transaction manager.

The method preferably comprises transmitting an acknowledgement to the client indicating that the transaction is deemed committed prior to updating the persistent storage medium. Thus, from the client's perspective, the transaction is considered complete even before the persistent storage medium has been updated. The message may be sent when changes have been committed at one or more processing elements (and hence indicate that the changes have in fact been committed), or may be sent before this point, and may simply indicate that the transaction manager has received the commit instruction and will ensure that the changes are subsequently committed and persisted.

In a preferred embodiment the transaction is a distributed transaction involving multiple processing elements. Thus, the method may comprise: performing processing at a plurality of processing elements, each processing element storing a respective set of data elements in a data area in memory associated with the processing element; transmitting processing result information from each processing element to the transaction manager; transmitting a commit message from the transaction manager to each processing element and committing the changes at each processing element; and updating the persistent storage medium based on the processing result information received by the transaction manager from each processing element.

Thus, the present invention can allow efficient committing of distributed transactions. Multiple processing elements are preferably connected to form an in-memory data grid, which term preferably refers to a collection of interconnected processing elements or processing devices each storing application data in local memory and each providing means for processing the data, e.g. to read, modify and delete data elements and communicate data to other processing entities.

The above method aspects and features relate to method steps performed cooperatively by various components of a distributed transaction processing system (for example an application client, processing elements in a data grid, a transaction manager, and a persistent storage interface or medium). Additionally, each individual system component, and the processing performed at each individual system component, may be provided as independent apparatus and method aspects of the invention.

Accordingly, in a further aspect of the invention, there is provided a method of performing processing at a processing element, the processing element having access to data elements stored in a data area in memory associated with the processing element; the method comprising: receiving a message to initiate processing; performing processing in response to the message, the processing resulting in changes to one or more data elements in the in-memory data area; transmitting processing result information specifying the changes to a transaction manager; receiving a commit message from the transaction manager; and committing the changes to the in-memory data area in response to the commit message.

The processing element preferably forms part of a distributed system, e.g. an in-memory data grid, as set out above. Performing processing preferably comprises starting a local transaction; and committing the changes preferably comprises committing the local transaction.

The processing element is preferably associated with a primary processing device, the method comprising providing one or more backup processing devices; and backing up the in-memory data area associated with the processing element or data elements stored therein to in-memory data area(s) of the one or more backup processing devices. Preferably, the method comprises updating the backup of the data area at the one or more backup processing devices when changes are committed to the data area at the primary processing device. Processing for the processing element is preferably switched to one of the backup processing devices in response to failure of the primary processing device. A status request may be sent to the transaction manager after the processing element has recovered from a failure. Transaction status information may then be received from the transaction manager, the transaction status information preferably including processing result information previously transmitted to the transaction manager, and the state of the processing element is preferably updated based on the received information.

The method preferably comprises storing processing result information relating to processing performed in response to multiple received messages at the processing element, and transmitting the stored processing result information to the transaction manager as a group and/or in a single message. The multiple messages (and associated processing) preferably relate to the same distributed transaction. Thus, processing results for a particular transaction resulting from multiple calls to the processing element as part of that transaction may be grouped. Preferably, processing in response to a given message is performed in a thread, the method comprising collecting processing result information for multiple threads associated with a given transaction, and transmitting the collected processing result information to the transaction manager when no more threads for the transaction are executing at the processing element. The method may comprise storing a counter for counting processing threads associated with a given transaction; incrementing the counter when a new processing thread is initiated for the transaction at the processing element; and decrementing the counter when a processing thread for the transaction completes; wherein processing result information collected for a plurality of threads associated with the transaction is preferably transmitted to the transaction manager when the counter is decremented to a value (e.g. zero) indicating that no threads remain executing for the transaction.

The processing element is preferably a software processing element, preferably in the form of or including a virtual machine, the software processing element preferably further comprising one or more of: a service interface for initiation of processing at the processing element; a data interface for modifying data elements in the data area preferably under a local transaction; and a transaction control interface for transmitting processing result information to the transaction manager and receiving transaction control messages from the transaction manager.

In a further aspect of the invention, there is provided a method of managing a transaction by a transaction manager, comprising: receiving from one or more processing elements participating in a transaction, processing results defining changes to be made to application data stored at the processing elements; receiving from a client an instruction to commit the transaction; performing commit processing to commit the transaction, the commit processing comprising transmitting a commit message to each of the processing elements instructing the processing elements to commit the application data changes at the processing elements; asynchronously with, preferably after, performing the commit processing, outputting update information for updating a copy of the application data stored in a storage medium separate from the processing elements, the update information based on the processing results received from the processing elements.

The method preferably comprises transmitting the update information to a persistent storage medium storing a persistent copy of the application data, to update the persistent copy of the application data in accordance with the received processing results. The update of the persistent storage medium thus preferably occurs asynchronously with (e.g. in parallel with or after) the commit processing. Thus, the commit processing is not dependent on the update of the persistent storage medium being completed. In other words, the distributed transaction may be committed (at the processing elements) before the persistent storage is updated. The method may comprise transmitting update information to a plurality of external systems and/or persistent storage media. Application data is preferably stored at the processing elements in memory.

The method may comprise transmitting a commit response to the client specifying that the transaction has been committed prior to outputting the update information. Preferably, the method comprises outputting the update information after the application data changes have been committed at the processing elements.

The method preferably comprises storing the received processing results in a buffer associated with the transaction manager.

Preferably, the outputting step comprises adding items representing sets of processing results for the transaction to a queue of processing results to be persisted to the persistent storage medium, preferably in the order the processing results were received at the transaction manager. This can help ensure that updates are applied in the correct order. Preferably the method comprises selecting, by an update process, a set of processing results in the queue and persisting the changes defined in the selected processing results to the persistent storage medium. Thus, the transaction manager may write processing results to the queue when a transaction is committed, with a separate update process processing the queue entries.

The method may comprise identifying dependencies between sets of processing results, and wherein the selecting step is performed based on identified dependencies, the dependencies preferably identifying sets of processing results relating to common data elements. Preferably, the method comprises accessing the queue by a plurality of concurrent update processes, each process preferably selecting a next available set of processing results for persisting based on: the order in which processing results were placed on the queue (or the order in which processing results were received); and any identified dependencies. In this way, multiple update processes or threads may operate in parallel to persist changes, whilst ensuring that changes are persisted in the correct order to maintain consistency of the data.

The method may comprise providing a plurality of transaction managers configured to manage transactions concurrently; preferably wherein transactions are allocated to transaction managers based on a transaction identifier. This can allow more transactions to be processed without the transaction manager becoming a bottleneck.

For improved reliability, the method may comprise providing one or more backup transaction managers associated with the transaction manager or with each transaction manager, and switching to a backup transaction manager on failure of a transaction manager. Preferably, the method comprises storing transaction information for a transaction managed by a transaction manager in an in-memory data area associated with the transaction manager; and backing up the transaction information to one or more in-memory data areas of one or more associated backup transaction managers; preferably wherein backup is performed when the state of a transaction is modified in the in-memory data area, for example when a transaction is committed.

The method may comprise storing processing results received from processing elements in a log file on permanent storage; and restoring processing results from the log file to a backup transaction manager, preferably in the event of failure of a transaction manager before processing results have been backed up to a backup transaction manager. Alternatively or additionally, the method may comprise storing processing results received from processing elements in a log file on permanent storage; and restoring complete or partial processing results from the log file to a transaction manager, preferably after restart in the event of failure of the primary transaction manager and all backup transaction managers before processing results have been persisted. Thus, the log file can provide additional protection against failure at the transaction manager (however, writing to the log file is preferably asynchronous and does not hold up commit processing, and may be achieved via a separate logging queue).

In a preferred embodiment, the following activities are processed asynchronously, substantially in parallel, after the 'commit' has been acknowledged to the client: committing to the processing elements (cohorts); persisting to persistent storage medium; and logging to a local log associated with the transaction manager.

In further aspects of the invention, there are provided systems, apparatus and processing devices comprising means (for example in the form of a processor and associated memory) for performing any method as set out herein.

In a further aspect of the invention, there is provided a computer program or computer program product or computer readable medium comprising software code adapted, when executed on a data processing apparatus, to perform any method as set out herein.

In a further aspect of the invention, there is provided a processing system comprising: an in-memory data grid for storing application data for an application and processing distributed transactions operating on the application data; a persistent data storage medium for persistently storing application data; and a transaction manager for receiving information specifying changes made to the in-memory data grid during processing of distributed transactions by the application and applying the changes to the persistent data storage medium.

In a further aspect, the invention provides a processing system comprising: an in-memory data grid for storing application data for an application, the in-memory data grid comprising a plurality of processing elements, each configured to store a portion of the application data in memory and to perform processing actions relating to the portion of the application data as part of distributed transactions; a persistent data storage medium for persistently storing application data; and a transaction manager for managing distributed transactions executed by the application, wherein the transaction manager is configured to: receive information from each of a plurality of processing elements participating in a distributed transaction specifying application data changes resulting from processing performed by the respective processing element; and commit the distributed transaction by a process including: receiving a message instructing the transaction manager to commit the transaction; and after receipt of the message, transmitting messages to each participating processing element to commit data changes to the respective processing element's in-memory application data; wherein the transaction manager is further configured, after the transaction has been committed, to update the persistent data storage medium based on the received information specifying application data changes.

Preferably, each processing element is configured to store a given portion of the application data which has been allocated to the processing element. In a preferred embodiment, at least one (optionally more than one or each) processing element stores the allocated portion of data entirely in memory (and so all allocated data is available in memory at all times). Alternatively or additionally, at least one (optionally more than one or each) processing element may store a subset of the allocated portion of data in memory (at any given time), preferably storing the allocated portion of data partly in memory and partly in local persistent storage (e.g. by paging out data not currently in use to local persistent storage as described elsewhere herein). The processing element is then preferably configured to fetch required data not currently stored in memory into memory when access to the data is requested by the application and/or when data changes are to be committed at the processing element. In this way, a processing element forming part of the in-memory data grid can manage more data than the element can store in its available memory by relying additionally on persistent storage, providing increased data capacity for the data grid as a whole and greater flexibility in the partitioning of data across the grid.

In a further aspect, the invention provides a processing element comprising: a data interface for accessing and modifying data elements in an in-memory data area associated with the processing element, the data interface configured to store separately from the data elements update information specifying changes made to data elements in the data area; and a transaction control interface for transmitting the update information to a transaction manager.

The processing element preferably comprises a processing module for performing processing at the processing element, the processing module configured to modify data elements in the data area using the data interface. The data interface preferably provides a transactional interface for modifying data elements, the processing module configured to modify data elements in the in-memory data area using a (local) transaction. The processing element is preferably configured to commit the (local) transaction to the in-memory data area in response to a commit message received from the transaction manager. The processing element is preferably configured to reconstruct the processing state (of a distributed transaction involving the processing element) at the processing element after an error using information received from the transaction manager.

The processing element preferably comprises code routines for execution by a virtual machine, the in-memory data area associated with the virtual machine.

The processing element may alternatively or additionally comprise software code for execution on a processing device and/or a processing device having a processor and memory for storing the in-memory data area.

The processing element may be configured to perform any method or participate in any method as set out herein.

In a further aspect, the invention provides a transaction buffer manager, comprising: a buffer for storing transaction data for a transaction executed by one or more processing elements connected to the transaction buffer manager; a transaction buffer interface for receiving processing results from the one or more processing elements defining changes to be made to application data stored in memory at the processing elements and storing the received processing results in the buffer; and a persistence interface for updating a copy of the application data stored in a persistent storage medium based on the processing results stored in the buffer.

The transaction buffer interface is preferably configured to transmit a commit message to each of the processing elements instructing the processing elements to commit the application data changes at the processing elements; and wherein the persistence interface is preferably configured to update the persistent copy of the application data independently of (asynchronously with) the transmission of the commit messages. The update may occur after the commit messages have been transmitted.

The transaction buffer manager may be configured to transmit a commit acknowledgement message to the client; and the persistence interface is preferably configured to update the persistent copy of the application data asynchronously with (preferably after) the sending of the commit acknowledgement message to the client.

The transaction buffer manager may comprise software code for execution in a virtual machine or on a processing device, and/or a processing device having a processor and associated memory for storing the buffer.

The transaction buffer manager may be configured to perform any method or participate in any method as set out herein.

The invention also provides method and computer program product aspects corresponding to the system, processing element and transaction buffer manager aspects set out above.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

FIG. 12 illustrates a user interface for specifying entity groupings;

Figure 1:
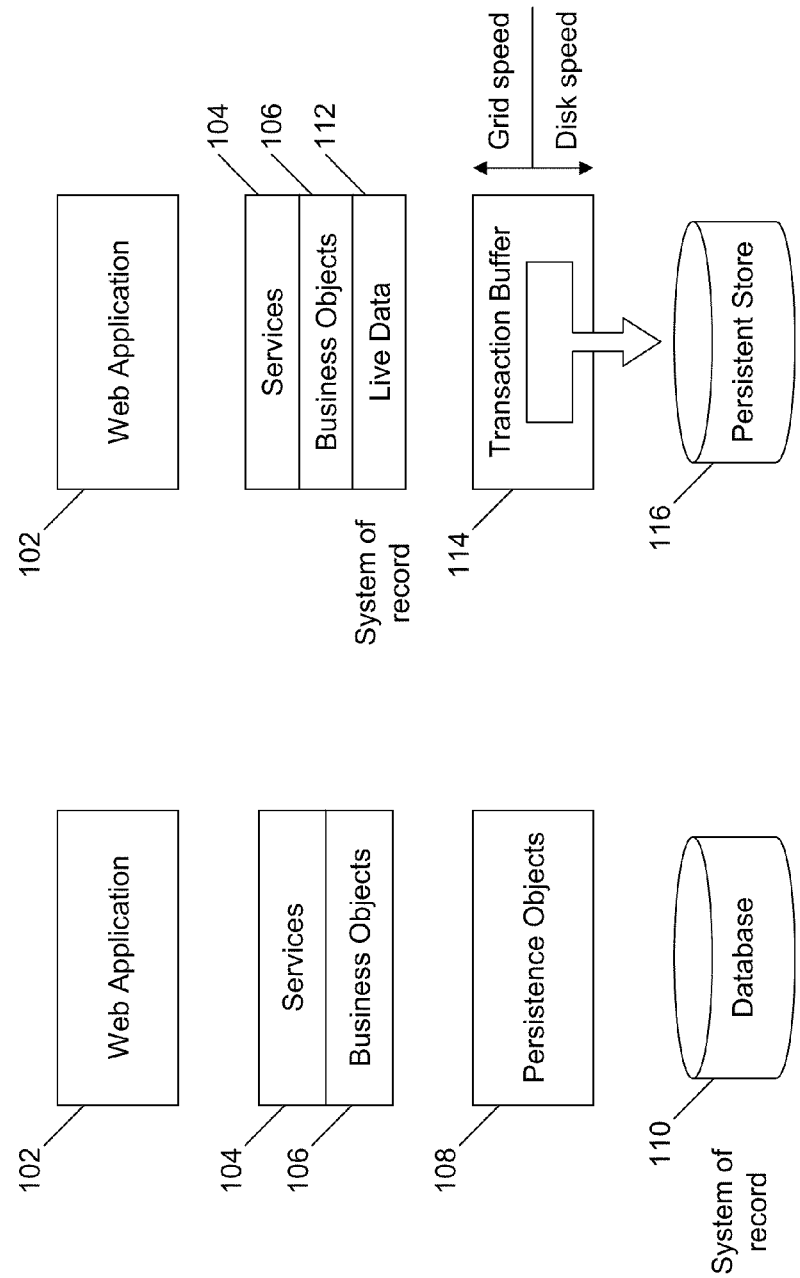
FIG. 1A illustrates a prior art application architecture.
FIG. 1B illustrates an application architecture in accordance with an embodiment of the invention.

Embodiments of the invention provide systems and methods of processing distributed transactions for an application implemented at least in part using an in-memory data grid (IMDG). A conventional application architecture is illustrated in overview in FIG. 1A. In the present examples, applications are provided based on a service oriented architecture (SOA), in which basic units of application functionality are packaged as services 104 which are made available to an application client, for example a web application 102. The services 104 operate on application data provided in the form of business objects 106 which model the given business domain of the application. For example, where the web application is a web store, the business objects may include customers, products for sale, orders, order lines, and the like. The business objects 106 are mapped to a set of persistence objects 108, which represent data which is stored persistently in a database 110 (for example a relational database) and provide a mechanism for persisting data changes to the database. This corresponds essentially to a conventional three-tier web application architecture (e.g. for a J2EE application server), comprising a presentation tier in the form of a front end for responding to a browser's HTTP requests, a mid-tier comprising the application logic and means for transforming information between the characteristic formats for presentation and database, and a data tier comprising object representations of the database tables.

To carry out a transaction, for example an ordering transaction, the web application 102 interacts with the relevant service or services 104 which operate on associated business objects 106. Changes made to business data via the business objects must typically be committed to the database 110 before a transaction can be considered complete. This ensures that subsequent processes and transactions have access to the correct data. The database 110 provides the "system of record", in that the data held in the database is considered the correct, complete and authoritative version of the application data (rather than any temporary copies of data held in memory associated with business objects). To ensure that the system of record remains up-to-date at all times, changes to business objects must therefore be persisted synchronously.

FIG. 1B shows by way of comparison a transaction processing architecture in accordance with embodiments of the present invention. As in the above system, here a web application 102 operates via services 104 on business objects 106. However, the business object data is stored (in the form of live data 112) in memory in the computer or computers providing services 104. This live data forms the system of record. To accommodate the amount of storage required to hold arbitrary-sized data-sets, this architecture may be replicated across multiple processing elements, each holding a different subset of the overall data, as is described in more detail later. A transaction buffer 114 is provided which receives details of changes made to the live data and buffers the changes for subsequent application to a persistent store 116. This may be a database as in FIG. 1A or some other form of permanent, typically disk based storage.

Once the transaction buffer has received details of changes made to the live data 112 as a result of some business transaction, but before the changes have been persisted to the persistent store 116, the transaction can be considered complete. It is the transaction buffer's responsibility after that point to ensure that the persistent store is updated at some point in the future to reflect the changes (and further, to ensure that changes from multiple transactions are applied in the correct order to ensure consistency), but it is not critical when this occurs. This is because the live, in-memory, data 112 is considered to be the system of record, and subsequent processes and transactions operate on that data. Thus, in this model, the manipulation of application data, which is held in memory, is decoupled from the process of persisting data changes to permanent disk-based storage. Persistence is therefore an asynchronous process in this model.

By using this approach, the web application is not delayed waiting for disk-based data updates to a persistent store before transactions are considered complete. Instead, only memory accesses are required to commit a transaction.

In preferred embodiments, the above architecture is employed in the context of a distributed transaction processing system, in which transactions are processed by multiple interconnected processing elements (e.g. servers), referred to as a grid. The grid implements the services 104 and stores business objects 106 and live data 112. Data is distributed across the processing elements in a grid, with each server storing and operating on a subset of the total application data set. Within each processing element, its portion of the data is held in memory, rather than on disk. This arrangement is commonly referred to as an in-memory data grid (IMDG), and is illustrated in more detail in FIG. 2.

The system comprises a client 202 which initiates distributed transactions (this may correspond, for example, to the web application 102 of FIG. 1B), and an in-memory data grid 204 for executing distributed transactions.

The grid 204 includes a plurality of interconnected servers 208. Each server 208 manages a portion of the application's data, referred to as a data partition (P), which is stored in server RAM (random access memory). Together, the servers thus provide the in-memory data grid, which provides the system-of-record, in that the in-memory data is considered the authoritative copy of the data. Each server is associated with one or more backup servers 210. In the event of failure of a primary server 208, a backup server 210 is switched to become the primary server and takes over responsibility for that partition. In particular, the backup servers are 'hot standbys' meaning that the portion of the application's data is replicated to the backup in real-time such that in the event of a primary becoming unavailable any backup will have up-to-date data and the application can continue without data loss.

A transaction buffer manager 206 (TxBuffer Manager) is provided in the form of a separate server. One or more backup servers may also be provided for the transaction buffer manager. The transaction buffer manager cooperates with the client 202 in managing the execution of distributed transactions by server grid 204 and stores a transaction buffer for storing details of changes made in any of the partitions of the in-memory data grid. Once a distributed transaction has been completed and committed, the transaction buffer manager is responsible for persisting the changes stored in the transaction buffer to the persistent storage, which may, for example, be a conventional relational database management system (RDBMS) 214, or some other form of permanent storage (for example, another type of database management system or a file system).

In preferred embodiments, the transaction buffer manager 206 can interact through one or more persistence interfaces 212 with various different types of persistent storage. Analogously, other interfaces 212 could also be provided to other external systems (e.g. monitoring, auditing, or reporting systems).

The servers in the server grid participating in a given transaction are referred to as cohorts of the transaction. The client initiating the transaction initially serves as the transaction controller and has the responsibility to decided whether to commit or abort the transaction and to ensure that all cohorts have finished their processing. However, as the transaction is committed or aborted, control of the transaction passes from the client to the transaction buffer manager.

Figure 3:
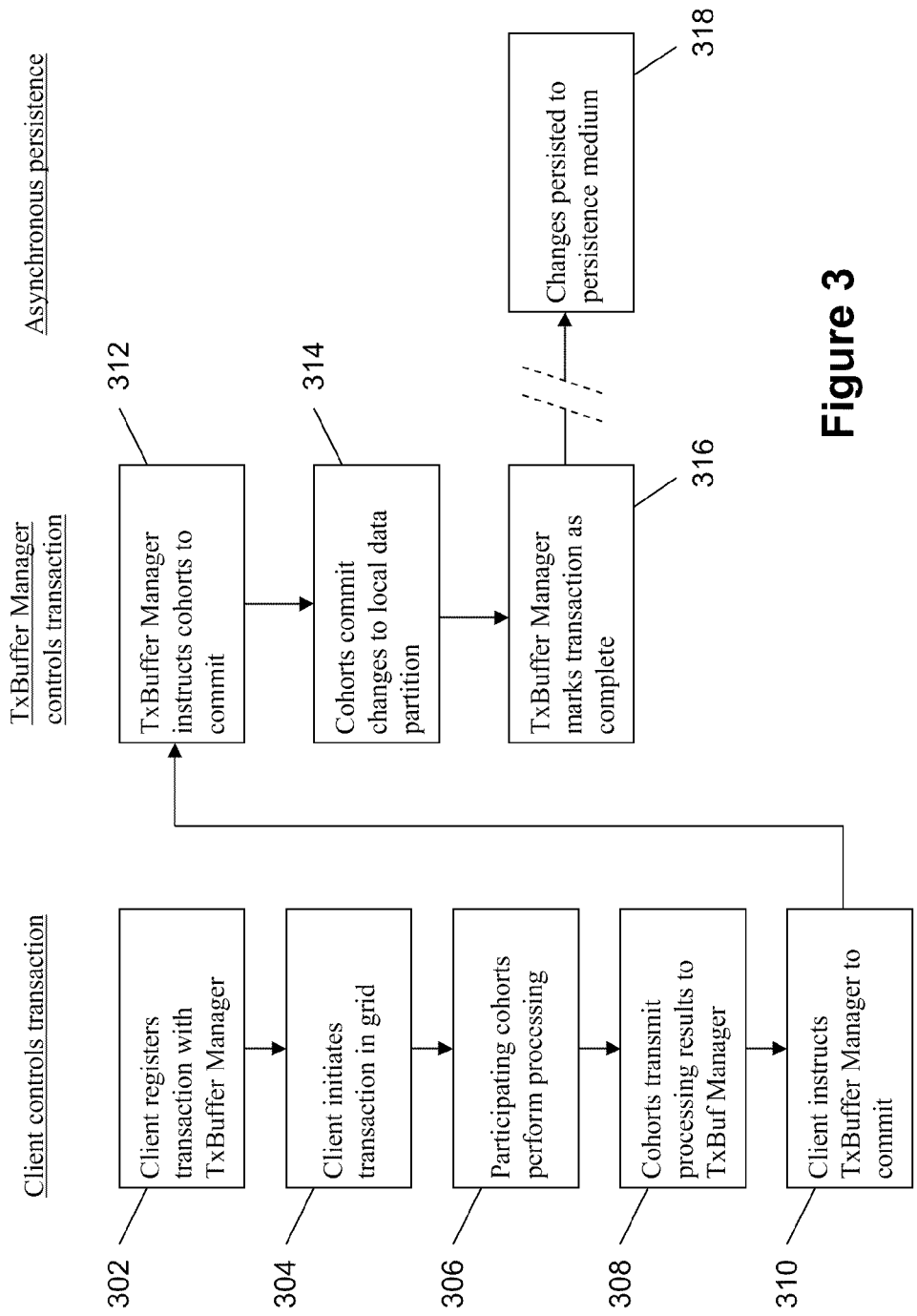
FIG. 3 is a flow diagram illustrating a method of processing a distributed transaction.

Successful processing of a distributed transaction by the system is illustrated in FIG. 3. The transaction buffer manager is referred to below in abbreviated form as the "TxBuffer Manager".

In step 302, the client creates a new transaction and registers the transaction with the TxBuffer Manager. In step 304, the client initiates processing of the transaction by the server grid by calling (in parallel or sequentially) one or more services (services may also call other services as part of a transaction). Service calls are routed to appropriate servers in the grid depending on appropriate criteria (described below). The servers participating in the transaction are cohorts of the transaction.

In step 306, each cohort performs the relevant processing to carry out the service call. The processing is performed (at least in part) in the form of a local transaction. Typically, this processing will result in one or more changes that are to be made to the cohort's local data partition. In step 308, upon receiving an indication from the application that a logical unit of the overall processing, such as a service call, has completed its set of changes, the cohort transmits details of these changes (referred to herein as processing results) to the TxBuffer Manager. These processing results may specify, for example, data elements that are being added, modified or deleted in the local data partition. However, the cohort does not commit these changes to the local partition of the data grid yet. The message to the TxBuffer also serves to register the cohort with the TxBuffer manager as a participant in the transaction. Thus, no separate registration step is required. The TxBuffer Manager stores the received data changes (processing results) in the transaction buffer.

In step 310, once the client determines that all service calls have been successfully completed, the client instructs the TxBuffer Manager that the transaction can now be committed.

Up until this point, the client has been in control of the transaction, and can abort (or roll back) the transaction (for example, in case of a failed or timed-out service call). However, once the TxBuffer Manager has been instructed to commit the transaction in step 310 and the TxBuffer Manager has noted the request, control of the transaction passes to the TxBuffer Manager, which is now responsible for ensuring that the transaction completes. The TxBuffer Manager should take extraordinary care to ensure that the transaction commits: the transaction will preferably only fail to commit fully if the primary and all backup processing elements in the TxBuffer Manager fail in the first few seconds (e.g. as a result of a complete system failure). Thus, from the client's perspective, the transaction is considered as "committed" after receiving the commit acknowledgement from the TxBuffer Manager.

After returning a positive acknowledgement to the commit instruction from the client, in step 312, the TxBuffer Manager instructs each cohort in the transaction to commit its changes to the local partition of the data grid. In step 314, the cohorts then commit their local transactions to update their respective local data partitions.

Once all cohorts have locally committed their changes, the in-memory data grid correctly reflects the outcome of the transaction. At this point, therefore, the TxBuffer Manager marks the transaction as committed (step 316). The transaction is now complete. Since the in-memory data grid is the system of record for the application data, subsequent activities can proceed and make use of any modified data immediately, without waiting for changes to be persisted to the persistent storage medium.

Subsequently, but asynchronously, application data changes defined in the processing results stored in the transaction buffer (as received from the cohorts during execution of the distributed transaction) are applied via persistence interface(s) to the persistence medium (step 318). The TxBuffer Manager ensures that changes are eventually persisted to the persistence medium, but this may not (and need not) happen immediately. Significant delays may occur, for example, if a database which is used as persistence medium is down or unreachable, without the operation of the application, which relies on the in-memory data grid, being affected. Furthermore, this arrangement means that transactions are committed at grid speed (i.e. at the speed of the server grid, where data updates are to RAM and hence relatively fast), rather than at disk speed (as is traditionally the case for disk-based persistent database storage). This leads to faster transaction processing and higher transaction throughput in the server grid, and hence greater responsiveness of the application.

The above description (and associated FIG. 3) show the major steps of the processing of a transaction as a sequential process. This is merely illustrative. Since the process involves distributed, parallel execution of a transaction by a server grid, individual steps may, as appropriate, occur in parallel or in a different order than indicated. As a particular example, a given cohort may transmit its processing results to the TxBuffer Manager (step 308) before another cohort has started its own processing (step 306).

In preferred embodiments, the different aspects of the commit processing performed by the transaction manager are carried out in parallel. Specifically, the transaction manager preferably proceeds as follows in response to a commit instruction from the client:
  make sure the transaction can be committed (e.g. there are no pending aborts from cohorts)
  then, start parallel, but lower-priority, threads to:
    send commits to cohorts
    persist to persistence target(s) (e.g. database)
    log to transaction log on local disk (logging is described later in more detail and may be an optional feature).
  after the above threads have been started, send an acknowledgement to the client that the commit instruction has been received and the transaction is being committed.

Thus, the committing of the transaction in the in-memory data grid is independent of (asynchronous with) the update of the persistent storage medium. Usually, since the update of the persistent storage medium takes longer than the memory updates at the cohorts, the update at the cohorts will complete before the update of the persistent storage medium (but this may not always be the case, for example, if a cohort is down).

If the transaction fails for some reason, then (usually) the TxBuffer Manager will instruct the cohorts to roll back their local transactions. This may occur, for example, if one cohort fails or if a timeout occurs. However, in some cases, the transaction state may be reconstructed at a failed cohort using transaction data stored at the TxBuffer Manager. Failure scenarios are discussed in more detail below.

Data may be partitioned across the in-memory data grid in a number of ways, depending on the requirements of the application domain. One partitioning approach will now be explained by way of example where the in-memory data grid stores the equivalent of a conventional relational database, but data may be stored in any suitable form.

A traditional relational database may include a number of tables, where each table consists of a plurality of rows, each with multiple data fields. Each row typically corresponds to some logical entity (for example a business entity, such as a customer or order), with individual fields defining attributes of the entity (e.g. customer name, address). Relationships may be defined between tables (e.g. between a customer and an order table).

In a first instance, data may be divided across multiple servers based on functional groupings, and based on the services operating on the data. For example, for a web store application, a "place_order" service may require access to customer data and order data, whereas a "product_search" service may require access to product data. By ensuring, for example, that customer data and order data are stored together, the need for referencing external data (i.e. held in another server) by the "place_order" service can be avoided (this is referred to as "locality of reference"). Thus, services and associated data are preferably grouped functionally.

However, typically, the volume of data even in a functional subdivision of the database will be too great to allow the data to be stored in RAM of a single grid server. Thus, in preferred embodiments, data for individual tables is partitioned across multiple servers based on a data key, typically, the table primary key.

For example, a customer table with a customer name primary key may be partitioned across servers based on the customer name (e.g. by assigning customer data for customers with names starting A-F to a first server, G-L to a second server, and so on). More typically, tables will have separate numerical primary key fields, which can be used to partition the data.

To ensure locality of reference (by functional division of data) as described above, data from multiple associated tables is preferably partitioned based on a primary key associated with one of the tables. This key is referred to as the routing key, as it permits a service call to be routed to the correct partition. For example, a "Customer" table, "Order" table and "OrderLine" table may be partitioned jointly based on a customer identifier (which is the primary key for the customer table). A given data partition will then contain all customer records within a specified range of the customer identifier, all order records associated with those customer records, and all order line records for those order records. In this way, all relevant order data for a given set of customers is grouped into a single partition, reducing the need for order-related transactions to access data in other partitions (since a given order transaction typically relates to a single customer). This is possible because order data and order line data is uniquely associated with a given customer. Organising the data in this way reduces the need for data references across the network to other partitions/servers and thus improves efficiency.

The functional division of database tables is preferably designed manually by an administrator based on knowledge of the application domain. Partitioning of data (i.e. division of tables into partitions) may also be defined manually or may be determined automatically based on volume of data and available server capacity.

The partitioning allows scaling of the application by modifying the data partitions (e.g. assigning a subset of data previously held on a single server to multiple servers to distribute load). In some cases this may require the application to be stopped and restarted after reconfiguration. Alternatively, data may be dynamically repartitioned (this would typically require partitions to be locked during repartitioning to prevent the application from accessing the data).

To simplify application scaling, the system preferably allows partitions to be defined independently of the underlying server grid, and multiple partitions may be assigned to a single grid server. Thus, for example, a given data set may be partitioned into 20 partitions, of which 10 are assigned to a first server and the other 10 to a second server. If the load on the first server increases, a new server may be added, and some of the first server's partitions may then be moved to the new server. This permits scaling of the application without redefining the partitioning scheme (and hence without restarting the application or locking large parts of the data). In one embodiment, each partition may be implemented as a virtual machine (e.g. Java virtual machine) with code representing application functionality (e.g. the services discussed above) and a data storage area for the partition's application data. Multiple virtual machines may run on a single server, and may be moved across servers to enable scaling.

Figure 2:
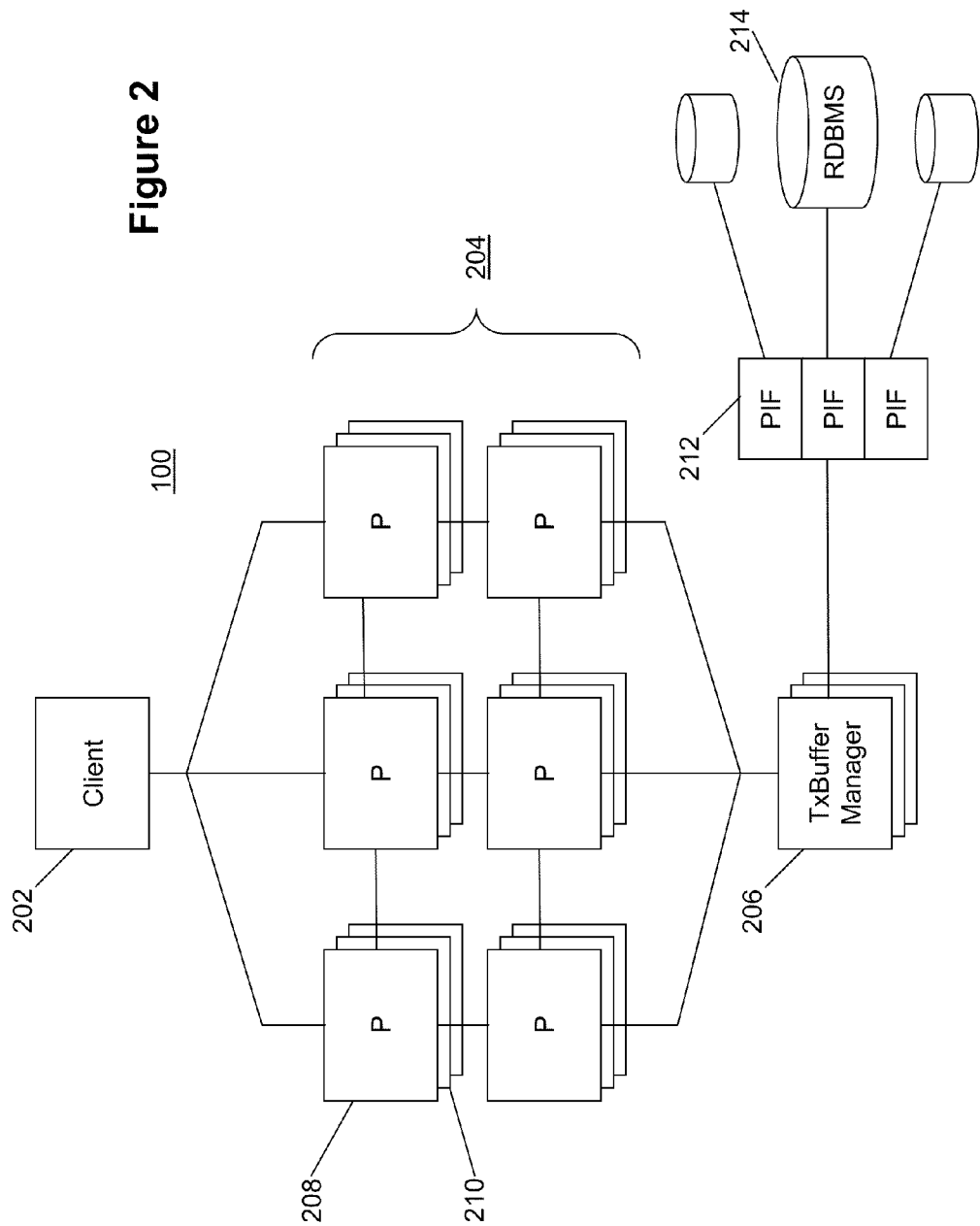
FIG. 2 illustrates a distributed transaction processing system.

Thus, instead of physical servers (as set out above), the data grid (e.g. as illustrated in FIG. 2) may consist of a plurality of software processing elements, each providing application services and storing application data. The software processing elements may then be arranged to run on underlying physical servers.

Since multiple partitions may be provided on a single server, this also means that the transaction processing system can be implemented on a single physical server running multiple partitions as virtual machines. Furthermore, some of the advantages of the system (in particular in relation to the increased transaction commit speed) can be achieved even where transactions are not distributed over multiple partitions/servers, i.e. where only a single partition/server is involved in the transaction. Thus, aspects of the system could be implemented in a single server/single partition system, in which an unpartitioned in-memory database is provided as the system of record, which is persisted asynchronously to a persistent storage medium using the persistence mechanisms described herein.

The transaction buffer manager may itself be partitioned. In that case, the internal transaction identifier assigned to the transaction (by a central process of the transaction buffer manager) is preferably used as the routing key for routing transaction messages/service calls (e.g. a commit call) to the appropriate transaction buffer manager partition where the information for that transaction is stored.

As mentioned above, local processing at each cohort is done as a local transaction. The local transaction facility provides the isolation (the changes in the data are only visible to applications via the transaction), locking (another local transaction cannot change the information) and atomicity (the changes are all or nothing—they are either all committed or all rolled back) characteristics. In this way, the system can ensure that changes are only applied to individual partitions in the in-memory data grid in the event of successful completion of the whole distributed transaction. In the case of a problem, local transactions are rolled back, ensuring that the entire in-memory data grid remains in a consistent state.

To mitigate against failure of individual servers in the grid, each server is associated with at least one backup server. Preferably, each server is associated with a local backup server (e.g. in the same data centre) and also a remote (e.g. off-site) backup server. Providing off-site backups can mitigate against certain failures (e.g. power failures, damage to data links) affecting both a grid server and its associated local backup server(s). Whenever a local transaction commits at a grid server, the changes are copied to its associated backup servers.

In the event of failure of the server, one of the backup servers then becomes the primary server. The newly-promoted primary server sends a query to the TxBuffer Manager for all distributed transactions the failed server was participating in which were not yet committed or rolled back (i.e. the primary server sees them as still "ACTIVE"). The TxBuffer Manager responds with the status of the transaction(s). The TxBuffer Manager also sends any processing results received from the failed server back to the backup server. This allows the backup server to revert to the state immediately preceding the failure and the backup server is then in the position to reconstruct the local transaction and if appropriate, because it has been committed by the client, immediately commit it. If the server failed prior to registering with the TxBuffer Manager and transmitting its processing results, the client will typically detect this via a timeout, and can either reissue its service call or can instruct the TxBuffer Manager to abort the entire transaction.

In the above example, the data stored in the in-memory data grid corresponded to partitioned database tables of a relational database. In preferred embodiments, however, an object-oriented data representation may be used, in which the application data is stored as a collection of data objects (corresponding to the business objects of FIG. 1), for example as Java objects. As above, objects are associated with a key, allowing them to be found wherever they are stored in the grid. Other data representations may be used.

The data grid may be implemented using a data grid platform such as JavaSpaces, or the GigaSpaces platform provided by GigaSpaces Technologies. These platforms provide functionality for storing and accessing data objects (specifically Java or C# objects) across a data grid. For finding data in the grid, JavaSpaces and GigaSpaces provide a 'lookup by template' approach. GigaSpaces additionally provides a 'lookup by SQL' mechanism, as well as the ability to distribute the search across all the partitions containing objects of a particular type, e.g. customers (thereby allowing a search such as "search across all Customer partitions for Customer objects whose name is "Fred Smith"). Due to the distributed nature, indexing is generally more limited in these platforms; for example, GigaSpaces provides an index to improve speed, but this only applies on a single node and with less functionality than a SQL-compliant database (by comparison, in RDBMS's, indexes are centralized and can be very complex).

Figure 4:
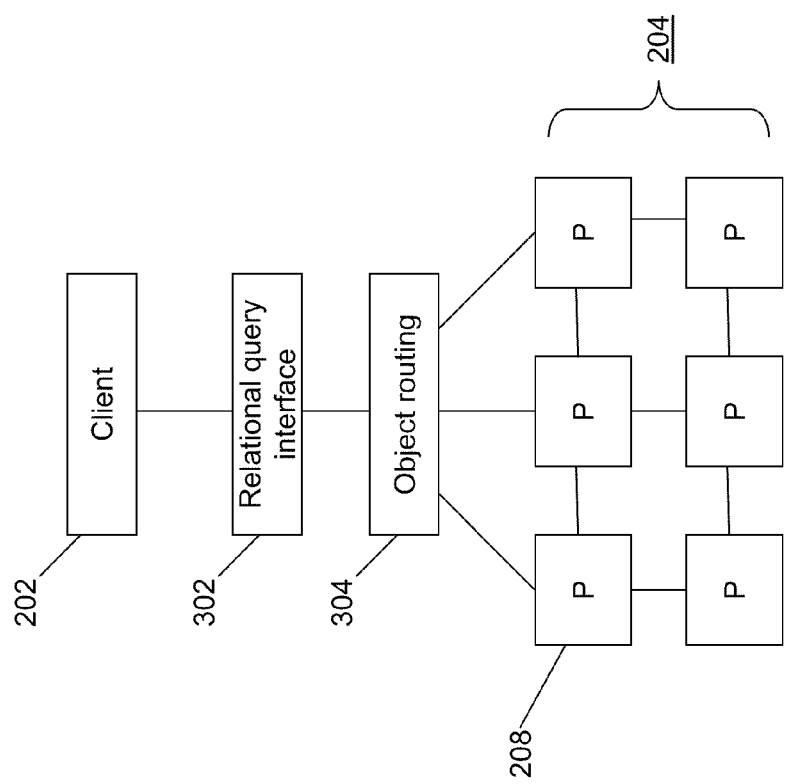
FIG. 4 illustrates a data interface to an in-memory data grid.

Regardless of the data representation used in the grid, the system may provide a data access interface which abstracts away from the details of the data structures used and in particular from the distributed nature of the grid, and to access all the application data as if it were stored in a single space, e.g. a single relational database. An example is illustrated in FIG. 4.

The in-memory data grid 204 stores the application data using appropriate data structures (e.g. Java objects) as described above, with data objects being accessible via a routing key. An object routing interface 304 routes data accesses to the correct partition based on the key (e.g. requests to add, modify or delete data objects; service calls). A relational query interface 302 allows data queries to be issued against the in-memory data grid using a conventional data querying mechanism. For example, the relational query interface 302 may receive SQL (structured query language) queries, including SELECT, INSERT, UPDATE and DELETE queries and other query types as appropriate. The relational query interface processes these queries and carries out the necessary steps to retrieve and/or modify data in the data grid as necessary. The relational query interface (optionally together with the object routing interface) may be implemented as a data access driver, for example an ODBC (Open DataBase Connectivity) driver or JDBC (Java DataBase Connectivity) driver. In this way the distributed nature of the database can be hidden from the client. This means that application developers can make use of the data grid and distributed transaction processing system without learning complex new skills, and existing applications can be adapted to utilise the grid-based approach without requiring application code to be completely rewritten.

Depending on requirements and context, other types of data access interfaces/abstraction layers may be provided to simplify access to the data.

By way of this abstraction layer and the persistence interfaces illustrated in FIG. 2, the format data is accessed in by the end client, the format in which data is stored in the in-memory data grid, and the format in which data is ultimately persistently stored on a persistent medium, may each be different, and may each be optimised for its particular context.

Furthermore, the data grid can be used to provide an in-memory database which mimics a conventional database, but which benefits from the efficiency advantages that result from being located in memory, whilst still ultimately being persisted to permanent storage.

As mentioned above, local transactions are used during processing at the cohorts for accessing and/or modifying application data in the cohorts' data partitions. This enables the system to ensure at least the correct order of changes as seen at the client, and to prevent inconsistent application-reads at different processing elements, in the face of the impossibility of guaranteeing the order of events across the processing elements.

By using exclusive reads to the GigaSpace and always reading and writing under transaction the system ensures that a user cannot read inconsistent data (i.e. get an old copy of a record that is in the process of being changed by a distributed transaction).

As described above, the transaction processing architecture is employed in the context of a system in which transactions are processed by multiple interconnected processing elements (e.g. software processes/grid servers) referred to collectively as a data grid. Application data is distributed across the processing elements in the data grid. Within each processing element, an allocated portion of the application data is stored in memory (e.g. RAM). This arrangement is referred to as an in-memory data grid (IMDG). However, in some embodiments some form of persistent storage may be substituted for the memory at individual processing elements, for example a local database or file storage on a persistent storage medium such as flash memory or a disk. In this case the same distributed transaction processing algorithms may still be applied to ensure reliable distributed transaction processing, since the described algorithms merely require that the processing elements have control over their portion of the application data and changes made to that data, but do not necessarily require that the data be held in memory. However, not all of the advantages of the IMDG-based system may be realised in that case (in particular in relation to transaction commit speed/transaction throughput). Nevertheless, such implementations are envisaged as embodiments of the present invention.

In a particular variation of the IMDG transaction processing system provided in one embodiment of the invention, data is held at least partly in memory at processing elements as described above. However, the amount of data stored and managed by a given processing element may exceed the available memory space, and the processing element may therefore use a combination of memory and persistent (e.g. disk-based) storage. In this case, currently needed data may be held in memory, while data managed by the processing element which is not currently in use is moved to disk or other local persistent storage. If access is required to data which is not currently in memory, then that data is fetched from local persistent storage into memory (this may, for example, be implemented in a manner similar to a cache or virtual memory system). This is preferably implemented transparently so that the rest of the system need not be aware of whether particular data is in memory at a given time.

Thus, in this arrangement, the system of record is still considered to be "in-memory", even though some of the in-memory data may be paged out to local persistent storage as necessary. To ensure correct handling of transactions, the processing elements merely need to ensure that the data affected by a transaction is in memory when the transaction commits.

This allows an in-memory data grid to be implemented using the above described transaction processing architecture, in which data capacity is not limited by the available memory capacity at the processing elements (though there may be a performance impact where an application operates on data not currently held in memory). Thus the term "in-memory data grid" as used herein includes data grids in which some or all of the processing elements store only part of their data in memory at a given time.

In a further alternative the information that is not in-memory may be resident in remote storage, rather than local storage. In one example, such data may only be resident in the persistent storage medium (e.g. storage 116 in FIG. 1B or 214 in FIG. 2). Such data is automatically updated by the persistence mechanisms described above (via the transaction buffer manager), so that when data which is not being used is to be removed from the in-memory data area (to make space for other data), the data can simply be discarded and no updates are necessary. Nevertheless, since data in use by the application will be held in-memory at the processing elements transactions can still be committed in the grid at high speed; with the data changes persisted to the persistent storage medium asynchronously as described above.

Detailed Implementation

A detailed implementation of the distributed transaction management system will now be described by way of example. Throughout this example, the system will be referred to as the "CloudSave" system, since the system permits the persisting (saving) of data from an in-memory data grid (or cloud).

The opportunity CloudSave addresses is to provide a platform and methodology that makes transactions fast, distributable, and reliable in arbitrarily-large applications where the system of record (SOR) is in an In-Memory Data Grid (IMDG).

Relational databases, queues or other 'persistence' mechanisms are employed for permanent persistence—eventually—but the authoritative source of data values as well as the application processing resides in the IMDG.

CloudSave uses the IMDG-as-SOR assumption to improve the performance and semantics of multi-database transactions. An important side effect is that single-database updates also commit faster (i.e. reduce the length of time the client waits) using CloudSave than using a database or any other disk-based approach.

Although the advantages of CloudSave stem to some extent from the IMDG features, the transactional part of CloudSave can also be used with data queues and transactions to mainframes, such as in JCA (J2EE Connector Architecture), as will be described in more detail later.

Three types of "distributed transaction" can be distinguished:

transaction-oriented API, hidden disks. For example, two mainframes run CICS; an application can use CICS transactions on the machines as transactions—there is no database-level access. In this approach, the application itself has no idea whether a requested transaction it has submitted is valid or not.

resource-oriented API, multiple resources. In many enterprise systems, "distributed transaction" means a central application having connections to independent resources—databases, queues or enterprise applications. As smaller computers became networked in corporate data centres, this became a way to integrate different domains (e.g. Order Processing and Customer Management) in a single application. Many applications in this category, and in particular web-facing business transactions, in this sense have become less focused on the CICS-type transactions and more concerned with databases and queues which are completely under the control of the application. In other words, many of the applications of this type have complete control over the correctness of the application from a business point of view. Even so, there are still platform issues (lack of resources, database constraints) that may cause a distributed transaction to abort.

CloudSave (in this embodiment) is primarily concerned with the applications deployed on a single grid or cloud infrastructure—so they are connected by a high-speed LAN—and where the application has the knowledge and authority to decide on the correctness of a transaction.

The CloudSave architecture is based on the distributed application using as its system of record the data held in the data grid (IMDG). An important implication of this is that the distributed application can make binding decisions about whether or not a particular transaction is valid. This makes handling of multi-database/multi-target transactions much easier: it enables the piggy-backing of transaction management messages with data flow messages.

Features and advantages of CloudSave include:

Reliability. CloudSave reliably succeeds or fails transactions in a given amount of time. This addresses the record of unreliability in existing approaches to this area. It is the 'A' (atomicity) in the 'ACID' acronym for desirable properties of database transactions.

Isolation. CloudSave isolates transactions (this is the 'I' in 'ACID'): updates from one transaction cannot leak into a concurrent transaction. This can be essential for simple programming, but is often not met, or not used, because of the high cost in traditional RDBMSs.

Durability. "In-Memory Data Grids" may provide sufficient durability for some applications, such as market makers. But for the vast majority of application developers, persisting to a permanent storage medium like disk—the 'D' for Durability in the ACID acronym—is essential to being able to commit to a business transaction.

Resilience. The CloudSave architecture, suitably configured, has no single point of failure.

System throughput. CloudSave defines a methodology and supporting features for locating the data optimally, where as much processing as possible takes place in one node. This reduces the need for communicating with other nodes to complete operations and so reduces latency and CPU overhead for serializing information for transmission.

Overall Response time. CloudSave provides transactionality that is relayed, preserving transactional semantics, to a traditional database. This makes it possible to use an IMDG for a broad spectrum of applications which provides read access to data at grid speeds rather than database speeds. The problem this solves is that developers familiar with RDBMS technology, to feel comfortable using an IMDG, would otherwise have to devise their own persist-to-RDBMS schemes in order to link into the backup and data integration technologies supporting RDBMSs. Or, put the other way round, database-oriented professionals and applications may not consider the speed benefits of IMDG to be as important as the security and correctness of transactions allied with all the other services such as data mining and allied applications that use databases as the central data source. CloudSave can allow applications to benefit from both speed and data security.

Commit response time. CloudSave commits at the speed of the memory-based components, rather than waiting for the save to disk. This reduces response-time by order of 10s of milliseconds per disk save. (This is the case for single database writes—it is not dependent on distributed transactionality.) In some situations, this amount of time can have a very large business impact—for example in trading. In user-facing applications, this amount of time can also have a surprisingly large business impact, because users get frustrated by long-running transactions.

Avoiding Reload. For large in-memory databases, reloading the data from the disk-based database can take hours. By using the underlying backup features of GigaSpaces and other techniques in the design of transactions, CloudSave can continue without interruption to the overall service in the face of machine failures.

Scalability. The architecture of CloudSave is appropriate for small applications but can scale to arbitrary large datasets involving hundreds or thousands of nodes.

Minimal Overhead of Distributed Transaction. The nature of the CloudSave distributed transaction is different from the known two-phase commit approach for databases. CloudSave takes advantage of these differences to minimise the overhead of the distributed transaction by using the following novel techniques:

Hold the status of the transaction in a backed-up in-memory storage area rather than on disc. It is typically 100 times quicker to write entries across a network to a backup storage area than to write to disk.

In two-phase commit, there is uncertainty as to whether the cohorts will be able to commit. CloudSave requires that each part of the transaction, when committed in a cohort, either commits or aborts during the distributed processing phase. This removes the first phase of two-phase commit—there is no need to ask the cohort if it is OK to commit—which improves performance and can ensure that CloudSave transactions can reliably succeed, or fail in a given amount of time.

Carry data with status. 'Cohorts' need to send data towards the database; this transmission can be accompanied by the distributed transaction control information, enrolling in the distributed transaction.

Using local transactions to minimise the cost of backups. In general, the application will write many entries into a node's managed data area for each part of the distributed transaction (for example, processing a web service request as part of a larger transaction). A benefit of using the local transaction to commit this to each managed data area—and do this only once, when the distributed transaction has committed—is that the write to the backup node is only done once, when the local transaction is committed. This minimises the number of cross-machine writes, which is the most expensive part of the local transaction.

CloudSave can reduce the possible length of in-doubt transactions, which occur when a cohort or its durable store goes down. This can take a long time (hours) that is potentially unbounded in classical distributed transactions. In CloudSave, the transaction is not in doubt past the timeout specified for the transaction. If the eventual target (e.g. a database) is down, the transaction is still complete as far as CloudSave is concerned and the in-memory state is committed. Instead, what is in doubt is the point at which this is persisted to the eventual target, but CloudSave preferably guarantees that it will be committed eventually and in the correct order.

JDBC/ODBC driver. Provision of the IMDG features as a JDBC or ODBC driver allows application developers to use the object-to-relational database mapping technology they are familiar with, rather than having to learn a different set of techniques for IMDG development. This is in contrast to other approaches to cloud persistence which have used alternative, non-RDBMS, architectures in order to avoid the distributed transaction problems.

Implementation Platform

In the present implementation, CloudSave uses grid technology based on the GigaSpaces platform, which in turn uses JavaSpaces concepts. In this implementation, the managed data area is a "space".

However, other embodiments of the CloudSave system could be implemented using other underlying platforms (for example based on other data grid products) or could include the necessary data grid technology as an integral part of the system.

Single Grid Node

Figure 5:
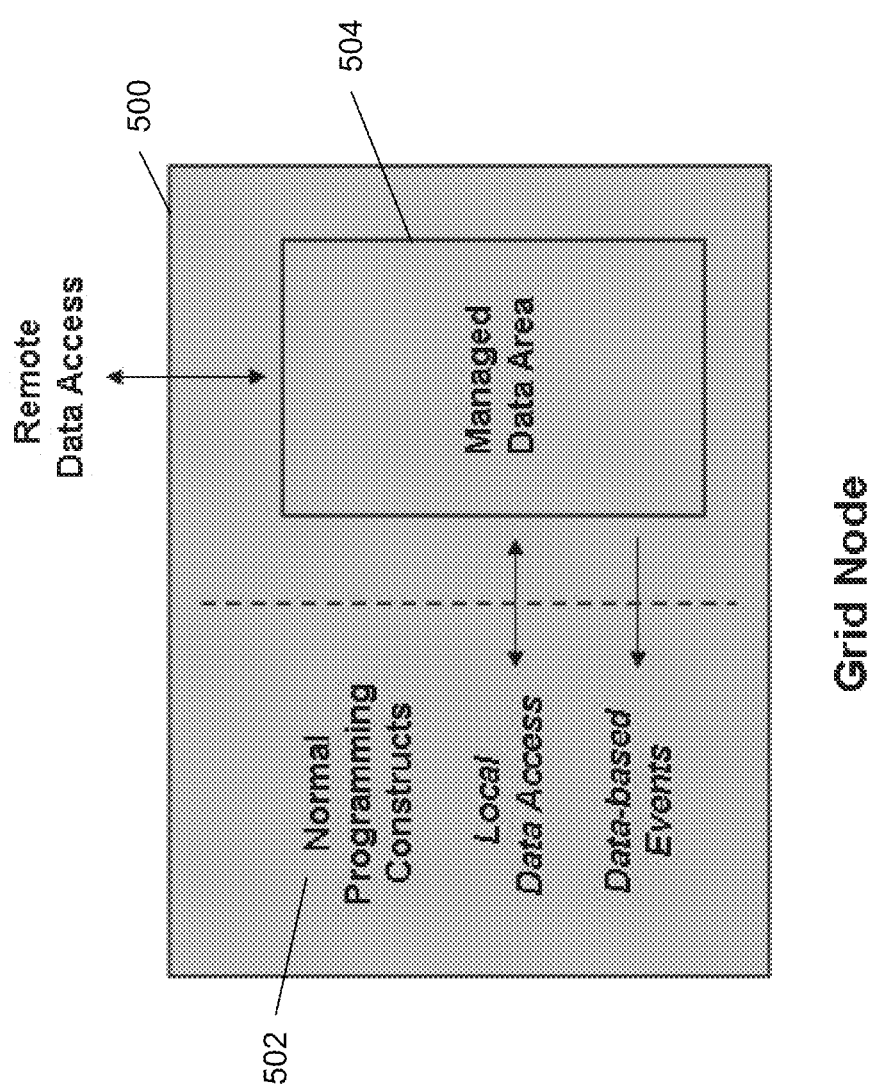
FIG. 5 illustrates a processing element of an in-memory data grid.

The programming environment for CloudSave is built on nodes organised into a 'grid'—a collection of nodes cooperating to implement an application. The single grid node is illustrated in FIG. 5, and may be implemented as a virtual machine (for example a Java virtual machine).

In addition to a normal programming area 502, like Java or .NET, the node 500 also has a managed data area 504. The managed data area stores the node's live application data. Updates to the managed data area can be made under a local transaction. Non-CloudSave applications can store information to the managed data area under local transaction; these will not interact with the operation of CloudSave distributed transactions except where there is overlap in the data objects used. CloudSave applications can store information under local transactions, but this is supplied by the CloudSave infrastructure which ensures that the managed data area is updated only when the distributed transaction (and hence the local transaction) is committed. The managed data area is available locally and remotely for data access—inserting, updating and deleting items of data—and querying, either via indices, SQL queries or brute force searching. Methods on objects in the normal programming area can be invoked dependent on information in the managed data area, such as changes of state in the information or the presence of certain information during a polling operation.

Backup Nodes

The data in the managed area can be automatically backed up to one or more backup nodes. The original node is called the primary. If the primary fails, one of the running backups will be elected to be the new primary, and external data accesses will then be directed to its managed data area.

Figure 6:
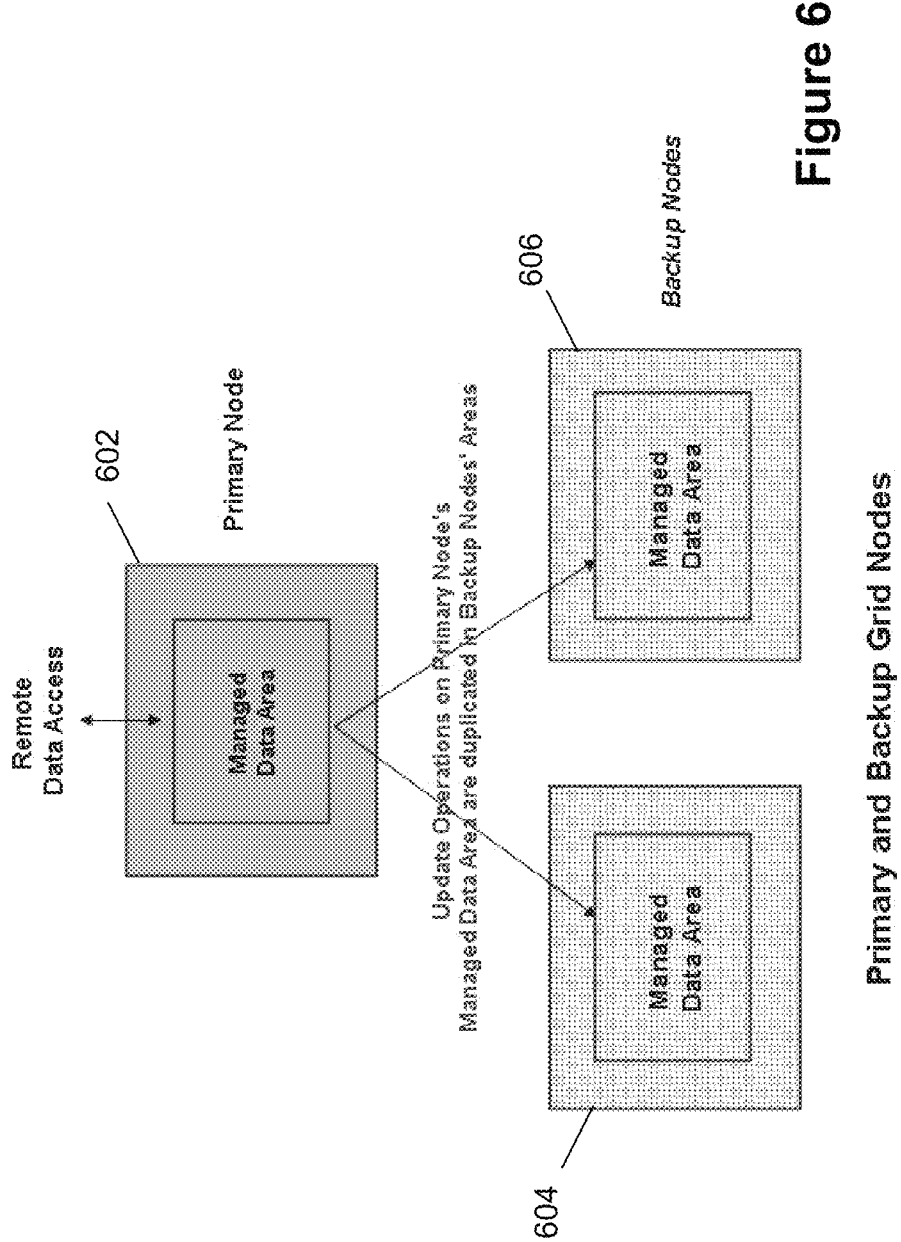
FIG. 6 illustrates primary and backup processing elements.

This is illustrated in FIG. 6, which shows a primary node 602 with two backup nodes 604 and 606.

Note that, in this embodiment, the normal programming objects are not automatically backed up (though this could be done in other embodiments). For non-stop operation, application developers should therefore ensure that any information that is essential to continued operation is written to the managed data area and also that the application state outside of the managed data area is reconstructed when the backup is promoted to become primary.

Partitioning

In general, a dataset—equivalent to a database table—will not fit into one node. For example, a given node may hold 1 GB of database data, and the database table occupies 8 GB. CloudSave assumes that both data areas and services can be partitioned using Content-Based Routing. This means that, when another node is trying to access some of the managed data, the partition to look in is determined by part of the data (one of the fields/columns). For the purposes of this description, this is called the "routingValue".

In CloudSave, the number of partitions is determined at configuration time: as long as the developer takes partitioning into account during the design, then the deployment is scalable—arbitrarily large datasets can be accommodated. The platform provides methods to determine (a) the partition number for a given routingValue and (b) the current partition's number.

Figure 7:
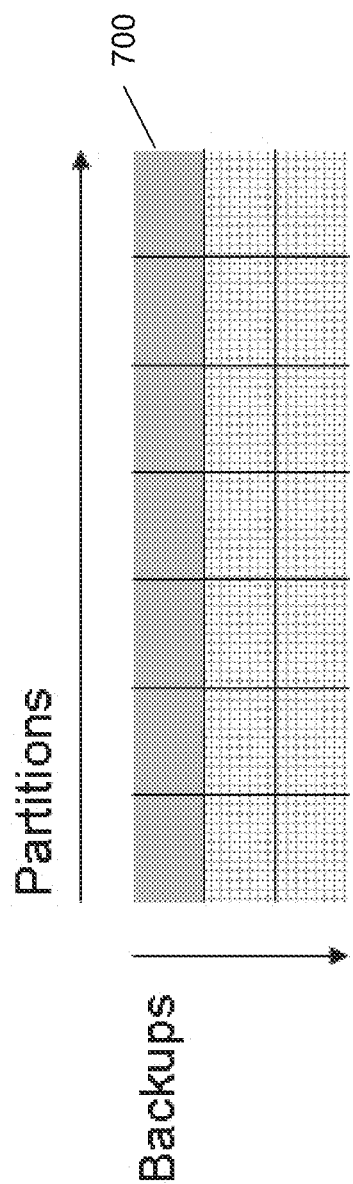
FIG. 7 illustrates a partitioned grid with backups.

FIG. 7 illustrates a partitioned grid with backups, where the vertical axis represents backups and the horizontal axis represents partitions. Typically one or two backups are used, so the grid will be two or three units high.

Services

Services, suitable for implementing Service-Oriented Architectures (SOA), can be provided to internal or external clients. As mentioned above, calls to services are sent via the managed data area. This means that services partition in the same way as data, so locality of reference is enhanced by directing services to the same partition as they are to operate on. For example, if a service operates on a customer and related data, then the service should use the same routing information as used on storing the data so that references to the customer information in question are local to the partition and avoid cross-network calls.

Transactions

The primary node provides the ability to do operations to the managed data area under a local transaction. This provides the following attributes which are useful in implementing CloudSave:

- uncompleted transactions are held in local memory of a node (not in the managed data area itself), which means that half-completed transactions automatically go away if the node crashes. This can be more convenient than interspersing the clean-up logic with other aspects of the distributed transaction
- multiple distinct operations can be committed all at once or not at all, which means that data rows and the status of the transaction can be updated in the same operation— again making it much easier to handle failure of an individual operation
- there is a performance improvement because multiple changes (i.e. inserts/updates/deletes) can be backed up in a single operation if a transaction is used; if this is not the case, each write to the managed data area must be backed up individually, which adds both processing and elapsed time overhead
- a first thread (using transaction A) to change a data item in one partition's managed data area can block threads using transactions other than A from reading or changing it until transaction A completes. The same may also be applied to reads: a first thread (using transaction A) can block threads using non-A transactions from reading the data item. This can be used to give good isolation between distributed transactions.

The Three Layers of CloudSave

CloudSave has three "layers" (see FIG. 2):
- the distributed transaction manager (206)
- the connection to the "persistent store" (212, 214), which is one or more databases in the default implementation, but this is pluggable so additional approaches for Cloud Computing can be used, such as BigTable/Hadoop, SimpleDB, MongoDB
- the presentation to the user/client (202) via a standardised database connection such as JDBC or ODBC.

The layers are described in the following sections.

Transaction Manager—User View

CloudSave incorporates a general-purpose distributed transaction manager that knows nothing about the specifics of what is being saved. Although the primary use of this capability is to support databases on grids—so the data will be database-like—it is also applicable to queue management and any other external resources, with the proviso that the IMDG application, rather than the external resource, determines the validity of the transaction.

The user view of the transaction manager has nodes in three roles:
- the "client", which starts the transaction and then has the responsibility to commit or abort (also called 'rollback') the transaction. In this description, these two activities are presented as being done by a single client, although this need not be the case, and the commit/abort decision could be delegated to another machine.
- one or more "cohorts"—nodes—which do the operational processing for the transaction, which is reflected in changes to the managed data areas
- the "Transaction Buffer (TxB)", which is one or more nodes that buffer information on its way to the database. For simplicity of the discussion, the TxB is presented herein as though it were a single node. In fact, it is possible that this is a group of nodes; we discuss how this is done later.

Transaction Processing Steps

The following gives a description of the steps involved in processing a distributed transaction (the steps are numbered T.1 to T.11).

T.1 The client calls the TxB to start a transaction, optionally passing in
- the business transaction identifier ("BizTxId")
- a timeout ("Timeout1") for the distributed transaction. If this is not specified, a suitable default will be chosen, of the order of seconds. It is permissible and expected that large transactions will run for significantly longer than the default and will be able to do this by starting the transaction with a suitably large timeout.
- a timeout ("Timeout2"), which is the length of time a cohort will wait before checking on the status of a distributed transaction.
- a timeout ("Timeout3"), which is the default length of time the operations to the cohort's managed area will wait before timing out.

T.2 If successful, as it will be in general, the TxB returns a "DistributedTxInfo" object. This must be passed in all subsequent calls involving the distributed transaction.

T.3 The client then starts off one or more activities (or threads) that will result in work being done by the cohorts. The mechanism for communicating with the cohorts is not part of the transaction manager, but it will preferably be done by the service calls to the appropriate cohort. Because Cloud-Save stores an in-memory view of a database, it is natural to have these services be represented by operations on business objects, being a processing extension of the database row. An implication of this is that a cohort may in general simultaneously process multiple activities for one distributed transaction.

T.4 To enroll in the distributed transaction, a cohort thread (running part of the application in the cohort) does not call the TxB as the client does. Instead, the cohort thread calls the CloudSave Cohort class's "getProxy( )" method, passing the "DistributedTxInfo" object. This gets a proxy to the managed data area that is specialised for CloudSave. A proxy is an object that implements a particular API for accessing some other object; in the present case, the proxy provides access to the managed data area provided by the underlying grid platform (e.g. Gigaspaces) whilst implementing additional functionality. Specifically, the proxy keeps a record of changes made to objects in the managed data area; and implements a local transaction for changes made to the managed data area. The application service uses this proxy in the normal way to insert, update or delete records in the space. A by-product of this call is that the cohort starts a "subtransaction"—its record of the distributed transaction and its action on the cohort.

T.5 Objects to be operated on with CloudSave that are intended to be persisted (i.e. they are not just using the distributed transaction features, as for example a messaging interface might) have a unique ID within the context of the distributed application. This is used for the content-based routing to the correct partition (in other words, this is the "routingValue" as described above) but is also used for its operations by CloudSave. For example, a typical object—say a Customer—would have its primary key—e.g. "15"—appended to the class name to create this unique ID—e.g. "Customer~15". For a given CloudSave "application", mimicking a database, this combination of table and primary key is unique. A multi-database environment could also be accommodated by prefixing this with the database/application name, such as "CRM~Customer~15". This value should preferably not change for the lifetime of the IMDG, but can be changed in between reboots.

Some databases may use multiple columns as the primary key. For example, order lines could have a primary key of "OrderPK" plus the ordinal line number. In this case the routing value could be constructed by concatenating the keys—e.g. order 27's first order line's routing value would be "OrderLine~27~1".

T.6 As part of its processing, a cohort may delegate activities to programs on the same or other nodes. In general there may be any number of threads, distributed in any way across the grid, doing processing as part of the distributed transaction.

T.7 A corollary of T6 is that it is possible for the same data object to be accessed multiple times, both within one distributed transaction and for multiple transactions. CloudSave uses the local transactions at the cohorts to:
  avoid deadlocks: subsequent threads to use a particular item of memory (either read or change) will time out after Timeout3.
  avoid un-isolated transactions. For practical reasons, isolation tends to be the most often relaxed ACID property in a DBMS. The approach described here requires few resources to implement, unlike for RDBMSs (relational database management systems).

T.8 When a thread in a cohort has completed its processing, it must finish its work with the distributed transaction by calling commit( ) or abort( ) (also referred to as "rollback").

The commit( ) indicates that this thread is happy for the distributed transaction to proceed. The abort( ) call indicates that this cohort has encountered a situation that is serious enough that the cohort knows the transaction must not complete; if any cohort thread calls abort( ) the transaction will not be allowed to complete. When the transaction manager is in support of an in-memory database, the abort( ) feature here can be used by database-like consistency checking (e.g. key constraints) to ensure the 'C' (Consistency) property.

The cohort should call the TxB synchronously to notify the TxB of the result of this subtransaction (more detail on this is given later). If it is an abort, the cohort just needs to send an abort indication; if it is a commit, the cohort should send a subtransaction-commit indication, plus all the data records changed. This effectively provides an implicit "Enrol" (of the cohort, within the distributed transaction) and "ready to commit" indication within a single message, together with the details of the data records changed, avoiding the need for separate messaging steps.

The call from the cohort should be synchronous as already noted, and the service in the cohort should not return its result to the client until it has received the result from the TxB. This approach can avoid a race condition: without it, the client could commit before the data and commit/abort indication from the client reached it. The synchronous chain ensures that the client, or intermediate services, can be sure that the changes made on its behalf will have reached the TxB by the time control returns to it.

T.9 The overall distributed transaction "returns" to the client, or times out. If there is a time out, the client should call the TxB to abort the transaction. Otherwise, the client finishes its processing and completes the transaction by calling the commit( ) or abort( ) method in the TxB (this is different from the cohort's commit or abort).

Note that, even when none of the cohorts have called abort( ), the client has the final say and can itself decide to abort. However, the client cannot overrule an abort( ) by a cohort: once one cohort has called abort( ), the overall distributed transaction will abort; subsequent committers will get a "transaction previously aborted" error return.

T.10 The commit or abort call from the client now completes the transaction by calling commit/abort to the TxB.

If the TxB has previously been told to abort by a cohort, it returns "Already Aborted", whether the client calls commit or abort. Otherwise, if the client calls abort( ), then the TxB marks the transactions as aborting, commits it to the managed data area and then returns "aborted" to the client. Asynchronously, it then instructs all the cohorts involved in the transaction (i.e. that have been called by their local application programs and registered processing results to be committed with the TxB) to abort their local transactions.

In the final case, where all cohorts have committed and the client calls commit( ), the TxB is now in charge of managing the transaction and is responsible for ensuring the transaction is committed. It first notes the client commit( ) by changing the state of the transaction to 'COMMITTING' in the managed data area transactionally, so that it is also recorded in backup servers. When that is complete, it returns the synchronous OK acknowledgement to the client. Then, later and in parallel, the TxB
  (a) instructs the cohorts to commit their individual transactions, so that the new state of the transaction is reflected in the cohorts' managed data areas. When this process successfully completes (which will be lengthy if cohorts have crashed or are reconfiguring), the transaction is marked as 'COMMITTED'.

(b) optionally writes the transaction to a local disk (this is not a database or the eventual persistence store—it is internal to the CloudSave transaction manager)

(c) and then proceeds to send the transaction to the RDBMS (the transaction data may be sent to multiple databases or other persistence targets if required). When this process successfully completes (which will be lengthy if a database is down), the transaction is marked as persisted.

The TxB guarantees (at least in everyday processing scenarios) the semantics of A (atomicity) and D (durability) of the desired ACID database properties. Furthermore, CloudSave takes care that the consistency of transactions is preserved through this process:

(a) rows that are changed by two distributed transactions are guaranteed to be propagated to the database in the order they were set in the cohort's managed data area (b) the order of changing rows that are changed multiple times within one transaction is preserved in the list of changes at the transaction buffer (c) if two distributed transactions affect the same cohort, CloudSave ensures that the commit requests to the cohort are in the same order.

T.11 Once the client's request to commit reaches the TxB, the distributed transaction will commit . . . but what if the reply to the client is lost, or the client crashes, or the client's caller crashes etc.? In this case, the "BizTxId" (business transaction ID), which is intended to be allocated by an external agent and reported through other media (such as web application logs), can be used to enquire of the TxB the state of the transaction.

Distributed Transaction Manager—Implementation

The implementation of the distributed transaction manager will now be described.

Logging and Check-Pointing to Backed-up Data Grid

The critical path for applications writing (as opposed to reading) information—saving business orders, for example—is usually the time it takes to commit information to the database. "Committing" is usually done by writing to a transaction log and, in the case of a distributed transaction, writing checkpoint information to disk.

CloudSave instead writes this information to backed-up data grids. Once the commitment has been made to the user, the implementation optionally, but preferably, writes the new transaction to a local disk forwards the information to the eventual persistence store, e.g. an RDBMS.

In large data centres, it has been estimated that nodes go down approximately once a year on average, whereas disks go down every three years. If the information was never saved to disk, using one node (of the IMDG) to commit information to would be less reliable than writing it to disk. But all managed data areas used for commit processing in CloudSave should by preference be backed up, which makes them more secure than average (two nodes would have to fail simultaneously for the transaction to be lost).

The possibility remains of power being lost in a data centre housing grid nodes and their backups. This is why CloudSave preferably commits a local backup to a disk file: there is then a window of a few seconds on average where the data is committed to memory alone.

Distributed Transaction Creation

When the distributed transaction is first created by the TxB, it writes the distributed transaction status record (the "DistributedTxInfo") with a status of "ACTIVE" to the TxB's managed data area. It does this outside of a transaction so that the information is immediately written to the backups.

It also allocates the "internalTxId"—an internal ID for the transaction that is unique within the running application. In some of the scalability schemes discussed later, it is also preferred that the "internalTxId" be unique beyond the lifetime of the application (i.e. between reboots). The CloudSave infrastructure provides a general-purpose unique ID allocator for use in IMDG applications that can be seeded from an external database and so used for this purpose; this approach can handle arbitrarily large applications. By default, a standard fast allocator is used that can handle one million transactions per second.

The TxB node should preferably be backed up, so that, if the TxB primary goes down, the node that takes over as primary has access to the current state.

At the same time as writing the "DistributedTxInfo", the TxB primary starts a timer that expires at the time indicated by "Timeout1". If the transaction has not committed by that point, the TxB unilaterally aborts the distributed transaction.

Cohort Sub Transaction

There is a hierarchy of control reflected in CloudSave "transactions":

The largest is the distributed transaction coordinated by the TxB.

The smallest is the local transaction feature used in a cohort to manage data changes The middle point is the cohort subtransaction, which operates at the cohort, and manages the allocation and use of the local transaction (i.e. it keeps track of the changes made via the local transaction)

requests from application threads to enrol with the distributed transactions at that node and then commit or abort its changes the interactions with the TxB.

An application running in a cohort node enrols in the transaction—at that cohort—by calling the Cohort class's "getProxy( )" method, passing in the "DistributedTxInfo". The first such invocation for a given distributed transaction creates a subtransaction within the cohort.

The distributed transaction and its services, using different routing IDs, may pass through the same space/PU partition more than once. This also means that multiple threads on a node may call getProxy( ) simultaneously, so it should be thread-safe. However, they reuse the previously-created subtransaction.

Different threads may use the same transaction object. "getProxy( )" recognises distributed transactions by the "internalTxId". It keeps a map—"LocalTransactionsInThisPU"—indexed by the "internalTxId" for this purpose; access to this map is single-threaded. The first time "getProxy( )" is called on a cohort for a given "internalTxId" (i.e. there is no record in "LocalTransactionsInThisPU" for the "internalTxId") is the start of a cohort Subtransaction.

To start the subtransaction, getProxy( ):— writes a "SubTransactionInfo" record to the managed data area outside of a local transaction (so it is immediately committed to the managed data area in the primary and backup servers). As with the TxB, cohort nodes are backed up, so that if the primary fails, the new primary has access to the necessary information to control the subtransaction. The "SubTransactionInfo" contains the "internalTxId"

the subtransaction status, initially ACTIVE. Other valid states are COMMITTED (which is only set when the whole distributed transaction is committed and the cohort notified of the fact), ABORTING and ABORTED.

a (long) subtransaction group counter. This is described below.

creates a local transaction. This is used to write changes to the managed data area. When the distributed transaction is committed or aborted, it is reflected in the cohort node by committing or rolling back this local transaction. There is no timeout set on the local transaction (assuming the infrastructure supports this); CloudSave is actively involved in tearing down a subtransaction.

Creates a map—"cohortOutstandingChanges"—to record the data records that have been changed in this node's managed data space. All the updates should be kept here until they are forwarded to the TxB (when the "last man out" or a subtransaction commits, as described below).

Groups and the "Last Man Out" Optimisation

In general, multiple threads in a single cohort node may do work on the same transaction and some of those threads may overlap. Imagine, for example, that thread T1 is the first to call "getProxy( )", starting the subtransaction. Then, before T1 commits or aborts, T2 also calls "getProxy( )" for the same subtransactions. Then T2 commits, followed by T1.

Due to the transaction isolation scheme used, as described below, these threads can change a record multiple times. This means it is not correct to commit T1's changes separate from T2's changes, because the order of changes on that cannot be preserved.

A correct way to process the totality of T1 and T2's changes would be: when T2 commits, save all the changes from T1 and T2 to date in order of commitment; then save the remaining changes when T1 commits. However, in smaller deployments, the amount of multi-threaded processing in a cohort may be significant.

CloudSave optimises the handling of this situation by using "last man out" processing. CloudSave keeps a "use count" for each subtransaction. This is used to recognise that, after T1 commits, there are no active threads in the node using the subtransaction and so T1 is the "last man out". The use count is initialized to 1 on first creation of the subtransaction (because by definition there is one user at that point) and incremented or decremented as each thread enrols or commits/aborts. When it reaches 0, this is the "last man out".

At this point, the cohort commits all changes to the TxB (assuming no aborts); this may be the last chance to do so. This set of changes is called a group. Each group has a subtransaction group counter—the group's relative position within the group. On the T1/T2 group, this would be 1.

Now imagine that T3 and T4 do more work on the subtransaction. It is important for committing, and during recovery, to know that this group comes later than the T1/T2 group. So the subtransaction group counter is incremented and the group sent to the TxB when the T3/T4 group's last man is out.

Cohort Data Operations

Having called getProxy( ), the service application within the cohort can now read and update records in the managed data area.

Transaction Isolation

In general, the user should use the transactional proxy for all accesses to the managed space, because it ensures isolation. The use of transactions to manage information in the space gives three levels of increasing isolation between distributed transactions interested in the same space. The most basic level of isolation is that a service using transaction B should not be able to read or write a record that has been changed by transaction A.

Additionally, CloudSave allows the programmer to specify that a transaction B should not be able to read or write a record that has been read by transaction A. Effectively this is an exclusive read lock. This supports the use case where a distributed transaction gathers together—i.e. reads—the back-end records that have previously been displayed on a terminal or web page; having gathered data and checked, the intention is to validate and apply a set of changes. In this case, it can be most efficient to use the read to gain exclusive access to the record within a distributed transaction.

CloudSave also supports two approaches to resolving contention. In the first approach, "timeout3" (how long to wait on data operations at the cohort) is set to 0, causing transactions to fail immediately with a 'busy' error if another distributed transaction is using them. In the second approach, "timeout3" is lengthened—up to "timeout1", the timeout for the complete distributed transaction—which has the effect of allowing the subtransaction to try to complete the data operation by waiting.

Note that isolation only operates across transactions. Two methods, threads or services operating within the same distributed transaction may create, read, update and delete the same record many times during the course of the transaction—just not simultaneously.

Operation Semantics Mapping

The services collect any changes made to objects in the managed data area via the transactional proxy. This proxy stores information describing the net effect of each operation on the managed data area:

the state of a record before the transaction started (i.e. did it exist or not)

the final state of the record—does it exist at the end, and what are the values now.

Database insert operations have specific semantics: the record cannot exist previously. For other media, update and delete may depend on the object's prior existence. In order to support these views of the operations, the insert( ), update( ) and delete( ) operations are provided on the transactional proxy if they are not native on the underlying platform. For example, in a GigaSpaces implementation, the service can deduce pre-existence when writing to the managed data area:

e.g. when the "UpdateModifiers.UPDATE_OR_WRITE" modifier is applied, LeaseContext.getObject( ) returns null on a successful write or the previous value on a successful update.

The operational semantics should be preserved in the "cohortOutstandingChanges" list and then communicated to the TxB. In terms of architectural layers, this is preferably implemented as part of the IMDG layer of CloudSave rather than in the transactional layer. This can allow database operational semantics to be a pluggable extension to the base transaction management layer (for example, either using object-oriented inheritance or a factory method pattern); in this way, other data management approaches can be supported by the single transactional layer.

Subtransaction Commit( )/Abort( )

Once the service in the cohort has finished its work, it calls CloudSave's Cohort class to commit or abort its part of the distributed transaction (using the "internalTxId" of the "SubTransactionInfo" to locate the record).

The Cohort class reduces the count of threads in the server operating on this distributed transaction—if this is now 0, this thread is "last man out"—and then:

for the abort( ) call, if the transaction is not yet ABORTING, the cohort marks the SubTransactionInfo as ABORTING—both in its local memory and in the managed data area in both primary and backups—and synchronously sends an ABORT request to the TxB. By sending the ABORT request and ensuring it is received by the TxB, the application in the cohort can protect the integrity of its own semantics. For example, if the application is an in-memory database, it will want to abort the distributed transaction if the user makes a request that would put the database into an inconsistent state—and make sure this is enforced rather than relying on the client application program.

if the transaction is already aborting, returns an "Already Aborted" indication to the caller.

for the commit( ) call:

If this is the "last man out", all the collected changes to the local managed data area—in "cohortOutstandingChanges"—are transmitted to the TxB with a new subtransaction group counter, and the "cohortOutstandingChanges" map is then cleared, so any later changes will not cause retransmission of the earlier changes. In other words, the commit( ) for the last man out defines the end of the group. The reason for numbering the groups is to preserve order of commitment at the TxB. Because of the "transaction isolation" described above other operations will not affect this transaction and the order ensures that, on recovering from failure, changes to the same record in different groups are applied in the correct order.

TxB Group Commit Handling

The cohort communicates to a TxB service to commit the group. The service call has two parameters: the "internalTxId", also used to route the service call if the TxB is partitioned; and the list of changes made in this group. The TxB adds the list of changes to the end of the aggregate list of changes for the transaction. This is an in-memory data structure; it is more efficient in large transactions to delay writing to the managed data area until the overall distributed transaction commits.

TxB Group Abort Handling

The cohort communicates to a TxB service to abort the group. This has the knock-on effect of aborting the whole distributed transaction. The only parameter that needs to be passed is the "internalTxId", and this can be used to route the service call if the TxB is partitioned. On receiving the abort request, the TxB alters the status of the "DistributedTxInfo" object in the managed area to ABORTING, discards any previous changes from cohorts for this transaction and starts the process to notify other cohorts that have already transmitted results to the TxB to abort their local transaction. From this point on, all commit( ) or abort( ) requests from cohorts will receive a "previously aborted" message.

The Dangling Local Transaction

Note that the subtransaction does not commit the local transaction as part of 'last man out' committing. This means that the local transaction is left dangling. The state at this point is that the local transaction is held in the node's application area but not committed to the managed data area. If the primary node for this partition goes down, the local transaction's information will be lost. The ramifications of this will be discussed later.

Why a Local Transaction

The cohort's processing involves duplication of the subtransaction data. There is one copy in the local transaction (en route to the managed data area) and another copy in the "cohortOutstandingChanges". In other embodiments, a single copy may be stored, and this could eliminate the additional overhead of the information in the local transaction. However, duplicating the data in this way has some advantages; in particular, the local transaction provides a place to collect the aggregate changes across groups—this must be done somehow, as cohortOutstandingChanges gets cleared after each group is committed. As there is another collection required, it is easiest to use a local transaction, because this can take advantage of any searching facilities of the underlying platform, to automatically take into account pending changes on the transaction.

Timeout2

With a single message transmission it cannot be ensured that both transmitter and receiver know the same thing. Synchronous communications between the nodes in a distributed system are used to achieve shared knowledge, but even this can fail when node A sends a synchronous call to node B, which notes its new state as a result and then returns a positive acknowledgement of the new state, but the message never gets through to node A.

Timeout2 provides another chance for getting the commit/abort message from the TxB to the cohort, to complete the transaction. Normally this message is sent just after the commit or abort is received at the TxB. If this does not get through, a likely reason is that one of the nodes went down, and this situation is handled by the nodes, on assuming the primary role, trying to complete: the cohort asks for a retransmission if needed, and the TxB then resends the message.

However, the message may fail to arrive even if the cohort node itself has not failed. This case can arise for the cohort because the TxB only sends the Commit( ) or Abort( ) command once. If that fails, the cohort must recover. It does this by starting a timer using "timeout2" (the length of time to wait before checking on the status of the distributed transaction)

when the subtransaction is first started on each commit( ) from a "last man out" in the cohort on every expiration of the timer, it the transaction has not completed.

If this timer expires and the transaction is not complete at the cohort, it sends a message to the TxB asking for a retransmission of the completion (Commit( ) or Abort( )) command, and then restarts the timer.

Client Commits or Aborts

This corresponds to step T.9 above: all threads of the distributed transaction return to the original client. The client now either commits or aborts the transaction. The decision whether to commit or abort is based on the returns from the application services the client called. The returns should clearly be consistent with the cohort actions, but are outside the scope of CloudSave operation: all that matters is what the cohorts and the clients actually do.

It is possible to have a disconnect between the intent reported by the cohorts and what is done to the transaction. The services may (erroneously) report success, but in fact a cohort has aborted the subtransaction: even if the client commands the TxB to commit, the outcome will still be that the distributed transaction is aborted. Or, the cohorts have all committed and the services have all returned positive indications, but the client nevertheless issues an abort( ) based on application-specific criteria.

Up to this point, coordination of the transaction has been the responsibility of the client—in the normal run of things, it is up to the client to make sure cohort activities are all completed, to determine the outcome of the transaction and to instruct the TxB accordingly. But when the client issues the commit or abort, control moves to the TxB.

The commit( ) or abort( ) operations are made available by a service on the TxB and take the internal transaction ID as a parameter. This is marked as the "routingValue", which will select the appropriate partition if the transaction manager is in fact partitioned.

Abort( )

On receipt of this command, if the transaction has been aborted previously, the TxB returns "already aborted". Otherwise, the TxB

- Marks the transaction status as ABORTING.
- Writes the updated transaction status to its managed data area, synchronously committing it so that the information is copied to the backups.
- Discards all the cached changes in cohortOutstandingChanges.
- Returns a positive acknowledgement.
- Later and asynchronously, the TxB sends an Abort( ) command to each distinct cohort that has committed groups (as identified by the "routingValue" sent with the commit request). This can be done in parallel.
- At the end of this step it is possible that the TxB has not received positive acknowledgement from one or more cohorts. In that case, it sets a timer to go off at a longer time period than timeout2—to give the cohort a chance to request the acknowledgement. If the timer goes off and the transaction has still not reached ABORTED stated, then the Abort( ) command is sent to each cohort that has not replied yet. The cohort should handle the receipt of extra abort commands by responding with a positive acknowledgement.
- The cohort also operates timeout2, which appears to be trying to accomplish the same thing. However, timeout2 running from the cohort ensures that the transaction commits at the cohort. However, it cannot guarantee that the acknowledgement to the abort( ) that it (the cohort) acts on actually reaches the TxB: the message may be lost in transit or the TxB may go down just as it reaches it.

Commit ( )

The following steps are carried out in response to a commit( ):

1. The TxB updates the managed data area with the "DistributedTxInfo" object with an updated status of COMMITTING and with the aggregate list of changes for the transaction, using a 'synchronous commit-immediately' call (so that the backup of the new values to the backup nodes is done before the call returns)

2. The TxB adds the "DistributedTxInfo" object to queues for logging, committing and waiting-to-persist (e.g. to database), and then returns to the client. This means that the commit completes (from the perspective of the client) without writing to disk. The completion of the commit means that it is now the responsibility of the TxB to ensure that the transaction is reflected in the cohorts and in the backing database. Therefore, as far as possible, the commit processing should not fail.

3. Log file: Another thread takes the "DistributedTxInfo" object off the logging queue and writes it and the aggregate list of changes to a local log file. Preferably, the log file is uniquely named within a directory dedicated to transactions that have not been persisted; if the TxB is partitioned, this gives the opportunity for the nodes to share a central log area. On successful completion, the transaction is changed, in memory and all managed data areas, to indicate it has been logged.

The log file's main use is to recreate the transaction if the TxB node goes down—in particular if the primary TxB and all backups fail simultaneously (e.g. due to a power failure affecting primary and backup nodes). The TxB server that takes over the primary role examines all the transaction logs in the unpersisted directory, determining if they should be handled by this partition. If so, the node reinstates the "DistributedTxInfo" object and list of changes to its managed data area, by re-starting this commit( ) procedure. This will update the space and proceed to complete the transaction.

If writing to the log file fails, processing of the transaction continues as normal. The reason for the log is to recreate the transaction if the primary TxB and all backups fail before the transaction can be persisted to the permanent store, such as a database. Therefore, a problem here should not hold up the rest of transaction commit; that is why there are three separate queues used in TxB commit.

The system could be configured with multiple transaction logs on different node/disk drive combinations.

4. Commit to Cohorts: This is similar to the Abort( ) processing, except that the command to the cohort is now Commit. The cohort sends a Commit( ) command to each distinct cohort that has committed groups (as identified by the "routingValue" sent with the commit request). This can be done in parallel. Retry processing uses the same scheme and timeout length as for abort( ).

As for abort( ), once the TxB has received positive acknowledgement of the commit from all cohorts, the status of the "SubTransactionInfo" entry is changed to COMMITTED and written (with backup) to the cohort's managed data area, again, remaining there for a period of time before it is removed.

5. Persist: See the following 'Persistor' sub-section.

6. When the transaction has been logged, committed and persisted, the status of the "DistributedTxInfo" object is changed to COMMITTED and written to the managed data area and backups. All changed data information for the transaction is deleted from the TxB's managed data area and its backups—there will be no further use for it now the information is committed and persisted. The transaction buffer preferably also arranges for the transaction to be purged at some future time. Until that point, the client may request the status of the transaction based on the business transaction ID—which only makes sense if the client specified a non-null business transaction ID.

Persistor

There are two aspects to handling the persistor: ordering; and scaling.

To preserve transaction semantics, the transaction isolation preserved in the cohort should be respected during persistence. If performance were not an issue, the persistor could simply persist each distributed transaction sequentially. However, performance is likely to be of the essence in many situations. For example, the information may be persisted to a set of sharded databases: in this case, many threads (for example 3*number of shards) could operate in parallel to persist information.

The algorithm described here operates on the waiting-to-persist queue: transactions still on the waiting-to-persist queue have not been passed to the persistor class, but they can be dependent on the completion of the transactions still being persisted. Operations on the waiting-to-persist queue should be synchronized. The algorithm is optimised to minimise processing overhead.

The scheme operates by discovering dependencies between transactions. This is managed by two lists on each transaction in the queue: an "I am Dependent on Him" list and a "He is Waiting on Me" list. Note that the order of the transactions on the persist queue is the correct order to preserve transactional semantics, because of the use of local transactions in each managed data area: a distributed transaction must commit before a given record can be used in another transaction because it is held as part of the local transaction at the cohort, and the first transaction is placed onto the persist queue before the command is sent to the cohort to commit the local transaction.

The algorithm proceeds as follows:

1. A persistor thread searches for a distributed transaction W to persist. To do this, it examines each of the first 'n' transactions—e.g. the first 100 transactions—in the waiting-to-persist queue, starting with the oldest transaction.

2. If W's "I am Dependent on Him" list does not exist, it is created and filled. To do this, each transaction P on the waiting-to-persist queue that is younger (earlier in the queue) than P is examined, oldest to youngest. If transactions P and W have a changed record in common, then W is dependent on P to finish before it can be started and so the following relationships are entered in the dependency lists:

"I am Dependent on Him": W→P

"He is Waiting on Me": P→W

3. Now we know the "I am Dependent on Him" list exists for W. If there are any entries in this list, it cannot be persisted now and the remainder of the queue must be examined in oldest-to-newest order in the same way. If there are no entries in the list, W can be persisted. The TxB calls the persistor class for the application, passing it W. This is a logical persistor class—it can save to file, database, backup grid or some other scheme. The class to be used here is configurable, with the default of CloudSave's persistence framework.

The logical persistor class used here should not return until the transaction is persisted. The TxB will prevent flooding, so the persistor can delay and retry as long as required to re-establish communication with the persistence medium.

5. If there are no transactions ready to persist (or the maximum of 'n' transactions has been reached without finding a match), the persistor thread waits for the persisting transactions to complete or for new transactions to arrive.

6. When a transaction F finishes persisting, the TxB undoes any dependency relationships because they are no longer relevant. Therefore, for each item W in F's "He is Waiting on Me" map, the inverse relation in W's "I am Dependent on Him" W→F is removed.

Scaling the TxB

The algorithm presented in the previous section assumes that the transactions and the dependency relationships are all in an un-partitioned managed data area (although backed up as noted previously). There are two reasons why it may be desirable to scale the TxB:

for performance. A very large database may be sharded or clustered, so many IMDG nodes can be involved in persisting the transaction. Alternatively, a very high-speed application may have a large number of nodes sending transactions to the TxB. In either case, the TxB itself may become the performance bottleneck for service resilience. An overall application can be kept running, and committing at high speed, even if the final persistence target—e.g. the database—goes offline. The number of transactions that can be held by this scheme can exhaust the TxB's memory.

Partitioning the TxB

To improve performance, the TxB can be partitioned—the performance will increase by the number of nodes in the partition. For this approach, the "internalTxId" is used as the partition "routingValue" (since it is unique to the transaction).

Three aspects of the TxB are centralized:

the allocation of the internalTxId. The request will be made to the central service which assigns the internalTxId and then instructs the TxB partition to start the transaction.

the assignment of the order in which to commit. The command to commit or abort goes to the TxB partition; it will have to get a commit order number—i.e. the "now serving number"—assigned by the central service; the centralized allocation of this number ensures that transaction order is preserved.

the "waiting-to-persist queue" from the Persistor section above, which now holds the transaction "internalTxId" and all the routing values of all the records changed by the transaction. When the commit( ) or abort( ) instruction arrives at the TxB partition, it passes the information for the waiting-to-persist queue to the central service. The persistence class can be configured to run either on the central service on or the TxB partition. When this has finished, the TxB partition operates the clean-up activities and the central service continues processing with the next item in the waiting-to-persist queue.

Service Resilience

If service resilience is the primary aim, then the limiting factor is the storage of completed transactions: a large application may persist 10 GB or more in a 24-hour period. In this case, partitioning the TxB is typically not necessary: the data part of the transactions can be rolled out to disk (but leaving the control record in place).

The TxB service can detect that the persistence service is slow by tracking available main memory, or the number of items in the waiting-to-persist queue, or the aggregate number of changed records in the waiting-to-persist queue. Once the TxB notices slow persistence, it starts sending the waiting-to-persist queue to disk. Preferably, this is stored in a different directory than the transaction log. Whereas the transaction log bases its file name on the "internalTxId", the order in the waiting-to-persist queue is preserved on disk by naming the files using the commit order number mentioned above, which are allocated sequentially.

Once roll-out to disk has started, new entries for the waiting-to-persist queue are stored to disk until all entries have been brought back into main memory. An entry is preferably brought back into memory when the TxB completes persistence of a transaction and there are no suitable entries in the waiting-to-persist queue.

Note that this scheme should span restarts: if a TxB has started sending the waiting-to-persist queue out to disk in one incarnation, when the system is restarted it must continue doing so.

Multiple Waiting-to-Persist Queues

The above scheme may block all transactions from persisting if there are in fact multiple persistence targets: one of them going offline will eventually cause all the transactions to pause. To avoid this, the "waiting-to-persist" queue can be split by target persistor class, which is available: each representation of a record in the TxB preferably has associated with it the name of its persistence class. Similarly, the scheme to roll out the "waiting-to-persist" queue to disk described above can be split by target persistor class. Additionally, this scheme can be further focussed, if the persistence class supports multiple targets, such as the persistence class that targets databases can be focussed on the route to the database (the "data source"). If this is done, only the queue for the persistor that is unavailable will be held up.

Timeouts

Timeouts assist in delivering reliability/atomicity. In a distributed system, it is impossible for two separated nodes to reliably know the same thing at the same time. Using timeouts gives a way of cleaning up after undiscovered failures. Timeouts are also part of good housekeeping since it is typically unacceptable to have resources locked infinitely if a box hangs.

The approach to timeouts is as follows:

1. The client can abort the transaction due to timeout at any point until he calls the TxB to commit.

2. Calls to services should have timeouts on the communications connections, which should then propagate to the proxy threads in servers processing the service operations. This gives a way of timing out service operations from the client and from the parent service if further (child) services are invoked. Failing this, service implementations should themselves take responsibility for timing out and cleaning up. The timescale on service timeout should be consistent with the timescale for the distributed transaction timeout, which implies that the timeout value should be present on the call to the service if the underlying platform does not provide it and the service should then take responsibility for timing out and returning.

3. The TxB can also abort the transaction due to timeout if no commit( ) or abort( ) is received from the client before Timeout1 expires. This is necessary if the client crashes during processing—it cannot be relied on to complete the transaction.

4. In preferred embodiments, once the commit( ) is received from the client and the TxB successfully updates its managed data area, it must commit: the transaction now cannot time out.

5. The cohorts should preferably not have a timeout on their local transactions. Instead, after a certain amount of time not hearing from the TxB whether to commit or abort, they poll the TxB for the status of the transaction. If the transaction status at the TxB is COMMITTING OR ABORTED, the TxB will instruct the cohort to commit or abort as appropriate.

6. To cover the case where the cohort thinks it has told the TxB it has committed but the message gets lost in transition, the TxB also has a poll of the cohorts that it doesn't know have carried out the instruction to commit or abort.

7. In general, time of day will be different on each node, so the implementation preferably uses a length of time to timeout rather than an absolute time in communicating timeouts between nodes.

Failures

This section describes the response to failures with reference to the transaction processing steps set out above and numbered T.1-T.11. Below, "T.m-T.n" refers to a failure after T.m and before T.n.

This approach assumes that there are one or more backups for the TxB and the cohorts. It is designed to continue in the face of failures of the primary and all but one of the backups for the TxB—depending on the length of the outage and the timeout, the transaction will complete successfully or fail with a timeout. It is also designed to continue successfully in the face of failure of a cohort primary and all backups.

TxB response to client failure at T.1-T.9: TxB cleans up based on "Timeout1". It marks the transaction as aborted in the managed data area and backups and then acts in the same way as an abort from a cohort: if any cohorts have committed/enrolled, it sends them an abort command; and if the client subsequently commits or aborts, it replies with an error message indicating "already aborted".

Client response to client failure at T.1-T.10: The client or the client's caller, if either went down before receiving the final status of the transaction—in particular after the client issued the final commit/abort, can determine the eventual state of the transaction by calling the TxB to get the status, which can be ACTIVE, COMMITTING, COMMITTED, ABORTING or ABORTED. If the status is ACTIVE, then the client should resolve it by calling abort for the transaction and wait for the status to become aborted, in order that it can then carry on and retry the transaction without getting locking conflicts at the cohort. For other statuses, COMMIT* means the transaction has committed as far as the client is concerned, and ABORT* means it has aborted.

TxB response to TxB failure at T.1-T.9: The TxB will recover using the "DistributedTxInfo" object when a backup node becomes primary.

Client response to cohort failure at T.3-T.9: If the cohort crashes before returning its result to the client, the client call to the cohort should time out (the client takes responsibility for this) and the client then calls the TxB to abort the transaction.

Cohort response to cohort failure at T.3-T.9 If the cohort crashes after returning its result to the client, the actions described in "Local Transaction Gone" below apply.

Client response to TxB failure at T.10: If the TxB crashes after the call to commit or abort reaches it and before it returns the result to the client, then the client will receive a 'remoting' (communication) error or time out. In this case, the client should return the failure to its caller. It is indeterminate what has happened from the client's point of view. In that case, it can enquire to determine the final state of the transaction.

Cohort response to TxB failure at T.10: If the TxB successfully records its intention to commit or abort and then crashes, the recovery process will carry on and commit or abort the transaction. This is described in more detail below in the section "Failure or timeout of TxB during Commit".

ACTIVE Subtransactions—Local Transaction Gone

It is possible that the local transaction has gone away by the time the TxB comes to commit it. This happens when the node is scaled out (i.e. moved to a bigger or smaller machine) or crashes. In this case a backup becomes primary. The local transaction is held locally (outside the managed data area) and is not backed up to the managed data area. Instead, as part of the movement to primary, the cohort checks its managed data area for any ACTIVE "SubTransactionInfo" entries. For each such transaction, the cohort queries the TxB for the current state of the distributed transaction, and, if it is now ACTIVE or COMMITTING, the operations to be performed for this sub-transaction.

Because of the isolation afforded by the local transaction, all these subtransactions will be disjoint between distributed transactions—no two distributed updates retrieved in this way can have updates to the same record. Therefore, the order of retrieving the ACTIVE or COMMITTING transactions and changes from the TxB is irrelevant.

However, ordering between subtransaction groups is significant. In order to process these in the correct order, the TxB sends the data for the subtransaction groups back to the cohort in the same order as they were sent (i.e. in low-to-high subtransaction group counter order). This processing is preferably done single-threaded.

If the current state of the distributed transaction is "ACTIVE"—the commit from the client hasn't yet gone through—then a replacement local transaction is started and the operations performed on the managed data area using the specialised proxy: this gets the managed data area and the subtransaction back to where they were when it completed the last successful return from a service call involving this transaction. Note that, having recovered the sub-transaction, the distributed transaction can continue and it is possible that services in the cohort perform additional changes to the managed data area using the reconstituted proxy, unaware that the sub-transaction has needed to be recovered.

This makes it clear that the cohort cannot wait to restore the transaction until the client commits. The other consideration is that other distributed transactions may try to do updates: before the partition becomes open for business. To prevent this, the cohort must not service any other requests until the recovery process is complete, ensuring that all changed objects in a continuing distributed transaction (which are still ACTIVE at the TxB) are correctly locked for update by the local transaction.

If the current state of the distributed transaction is ABORTING or ABORTED, then the "SubTransactionInfo" entry is moved into the aborted state. For the COMMITTING state, the operations during recovery are preferably still performed using a local transaction (a) to re-use the code (b) to ensure the subtransaction state and the data changes are both committed at the same time and (c) for the performance benefit in backing up that the local transaction brings.

Race Condition Recovering Local Transaction

If the TxB commit or abort starts happening while the "recreate" process of the previous section is in process, then the commit/abort command from the TxB to the cohort can time out.

However, the initial commit or abort call is made in the interest of speed when operating normally. If this fails to complete, the onus to complete the sub-transaction then falls, mainly, to the cohort. To handle this, the cohort sets a timer, using the "Timeout2" time for this subtransaction, after initiation (i.e. when the first service enrols for a given distributed transaction in the cohort) and after all "last man out" processing is completed, to trigger the poll to the TxB requesting the COMMIT/ABORT command be sent to it. If it still has a local transaction, this is all the cohort needs; if it is moving to primary and has lost the local transaction, the cohort also asks for the information it needs to reconstitute the transaction. However, as noted previously, it is possible that the cohort actions a commit or abort instruction that then gets lost before reaching the TxB, so the TxB still needs a slow timer to check the status of committing and aborting at the cohort.

However, there are two optimizations to improve the time to recover from an outage. As the TxB moves to primary, it sends a COMMIT or ABORT command to all cohorts whose subtransactions are in the committing state; the TxB notes when these commands are successfully acknowledged by moving the state of the subtransaction to COMMITTED or ABORTED. Similarly, as the cohort moves to primary, it immediately resolves the subtransaction status as described in the previous section.

Note that race conditions and the need to retransmit mean that the cohort should simply ignore redundant commands from the TxB.

Note also that the overriding importance of keeping the in-memory database correct means that the cohort should not complete its transition to primary—and start servicing calls from application program services in the cohort—until it has successfully resolved the state of the sub-transaction. This means that the response from the TxB to the cohort's request for the subtransaction records is synchronous. However, even if this reply completes successfully as seen by the TxB it is not guaranteed that the message is successfully actioned by the cohort. Therefore, the TxB does not mark this cohort as committed or aborted after this exchange and the TxB checks the status of the cohort the next time the slow timer times out.

If the 'moving to primary' process cannot be completed in a timely fashion, then the cohort does not complete its assumption of the primary role, does not open for business and requests that another node become primary.

Failure or Timeout of TxB During Commit

Once the TxB starts the commit process, all the information for persisting the transaction is in the TxB's managed data area. If the primary TxB fails and a backup moves to become primary, or there is a long pause for some other reason, then the commit( ) calls to the cohorts will be delayed.

However, the process described in the previous section will catch this—the cohort will use the timeout2 processing to check the state of the transaction at the TxB and proceed to commit its sub-transaction, as long as the TxB has got to the point of setting the COMMITTING status of the "DistributedTxInfo" record in its managed data area. This illustrates that the call from the TxB to the cohort can be considered a performance optimisation, and is not essential to the correct functioning of the commit process.

Comparison to the Two-phase Commit Protocol (2PC)

A two-phase commit protocol (2PC) has historically been used by applications where multiple distributed databases are used to ensure concurrent commitment of transactions. This section compares the distributed databases approach with CloudSave. The description of 2PC assumes a coordinator, or master site, separate from the cohorts although some products allow the coordinator to be configured co-resident with one of the cohorts, which would reduce the number of messages—but not the number of disk-writes.

Figure 8:
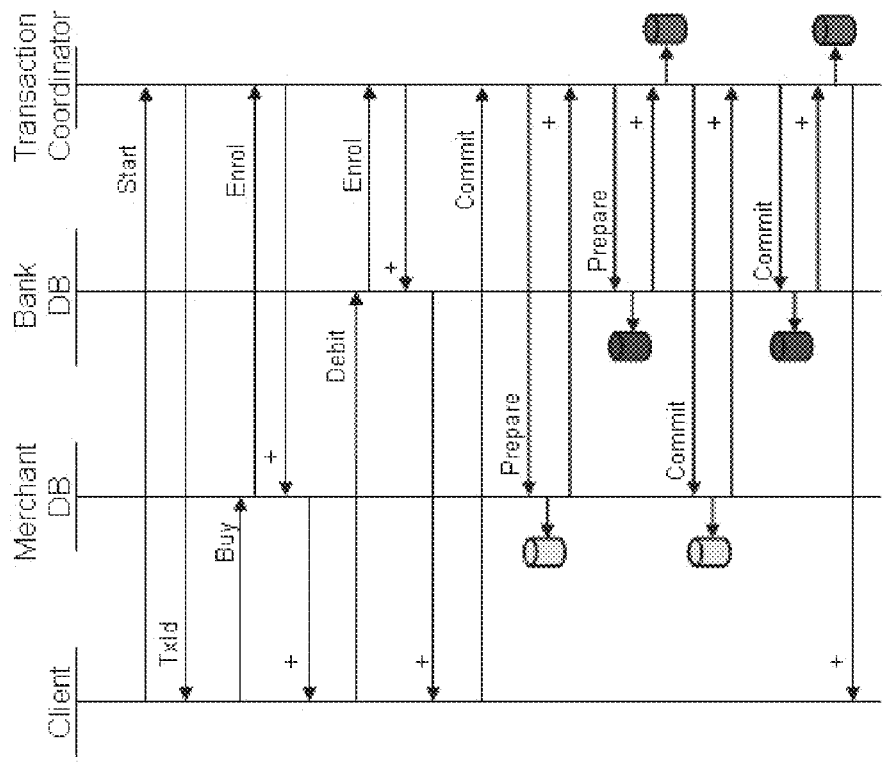
FIG. 8 illustrates a two-phase commit protocol for distributed transactions.
Figure 9:
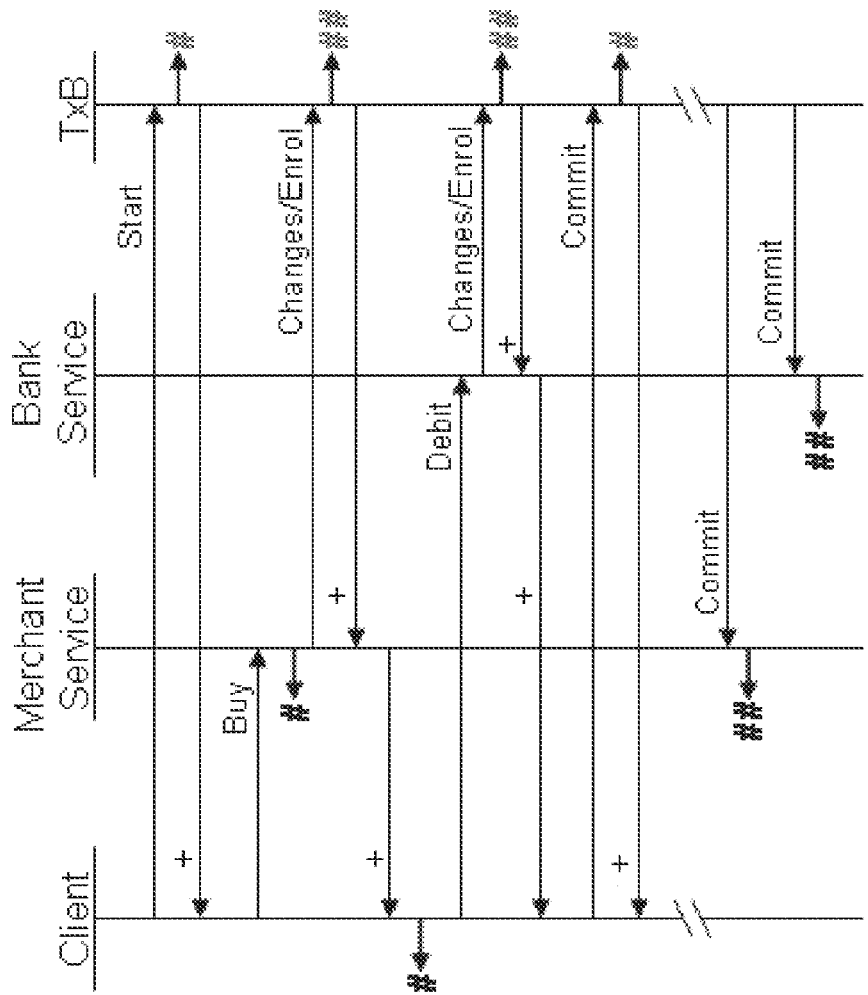
FIG. 9 illustrates a transaction processing protocol in accordance with embodiments of the invention.

The situation addressed by CloudSave is fundamentally different from conventional 2PC implementations: CloudSave assumes that the authoritative, up-to-date application data—the System of Record (SOR)—is available during its calculations. The consequences are demonstrated in the interaction diagrams for the two cases shown in FIGS. 8 and 9, of which FIG. 8 illustrates a 2PC transaction and FIG. 9 illustrates a CloudSave transaction. In FIG. 9, The single "#" symbol represents a write to the managed data area on one record, to create or update the transaction status; the double "##" represents the write of many records—the real data and possibly a control record—as part of a transaction.

The discussions about 2PC often focus on the number of messages passed. However, this is not the essence of the CloudSave approach—the messages are shown here purely to aid comprehension. An important point demonstrated by FIGS. 8 and 9 is that the 2PC version requires at least 6 disk writes (which must be committed to disk, not cached) on the critical path, compared to none for CloudSave.

The difference in messages lies in the "prepare" and "commit" messages issued by the 2PC coordinator. The prepare messages are redundant in CloudSave because the three situations where the "prepare" could return a 'not OK' are taken care of as follows:

the cohort, during its processing, (a) observes the semantics (e.g. of the database schema) of the transaction and (b) manages the record locking.

the other reason a transaction may fail is that the database runs out of resources. In CloudSave, this is preferably not allowed. Instead, if the cohorts start to run out of resources, they should not allow the transaction to proceed. If the TxB starts to run out of resources, it should roll out pending transactions to disk.

The 2PC "prepare" messages from the transaction coordinator to the cohorts are unnecessary in CloudSave. 2PC "prepare" gets agreement from the cohort that it can commit the transaction—that the cohort has the resource to commit and that the transaction is correct and consistent within itself and with other simultaneous transactions. This question is unnecessary in CloudSave because it is already answered in the Changes/Enrol messages from cohort to TxB: sending information to the TxB is equivalent to the agreement to that part of the transaction. At this point, the cohort should be sure that the subtransaction is valid.

Locality of Reference

CloudSave provides an extra feature to increase the percentage of references that are entirely local (i.e. within the node's virtual machine). This is the ability to group 'entities' (which term refers here to objects that persist to a database table) together and ensure that related entities are in the same partition.

There are natural clusterings of entities referred to herein as entity groups. The reason for using entity groups is to put related entities together into a single managed data area (e.g. implemented as a 'space' on the GigaSpaces platform)—and into a single partition, as described below. This means that references between these related entities are local (within the same virtual machine, no serialization or RMI calls necessary to access data on a related entity).

The grouping of entities is application-specific, and up to the developer's judgement. For example, in an ordering application, one approach may be to group "Customer", "CustomerAddress", "Order" and "OrderLine" entities into one group. Another valid approach would be to split the group: "Customer" and "CustomerAddress" into one entity group; "Order" and "OrderLine" into another.

The allocation of entities to groups, and which relationships are constrained to lie within the managed data area, is defined in a configuration file, which is fixed for a given run. This is used to generate the classes that are used to hold entities in the IMDG.

As noted above, it is preferred that related entities are placed into a single partition when a cluster is partitioned. This can be achieved by requiring all operations targeted at a single entity (i.e. not searches or similar that would use a Map-Reduce approach across all clusters) to use the primary key of the master entity for routing to a partition.

Figure 10:
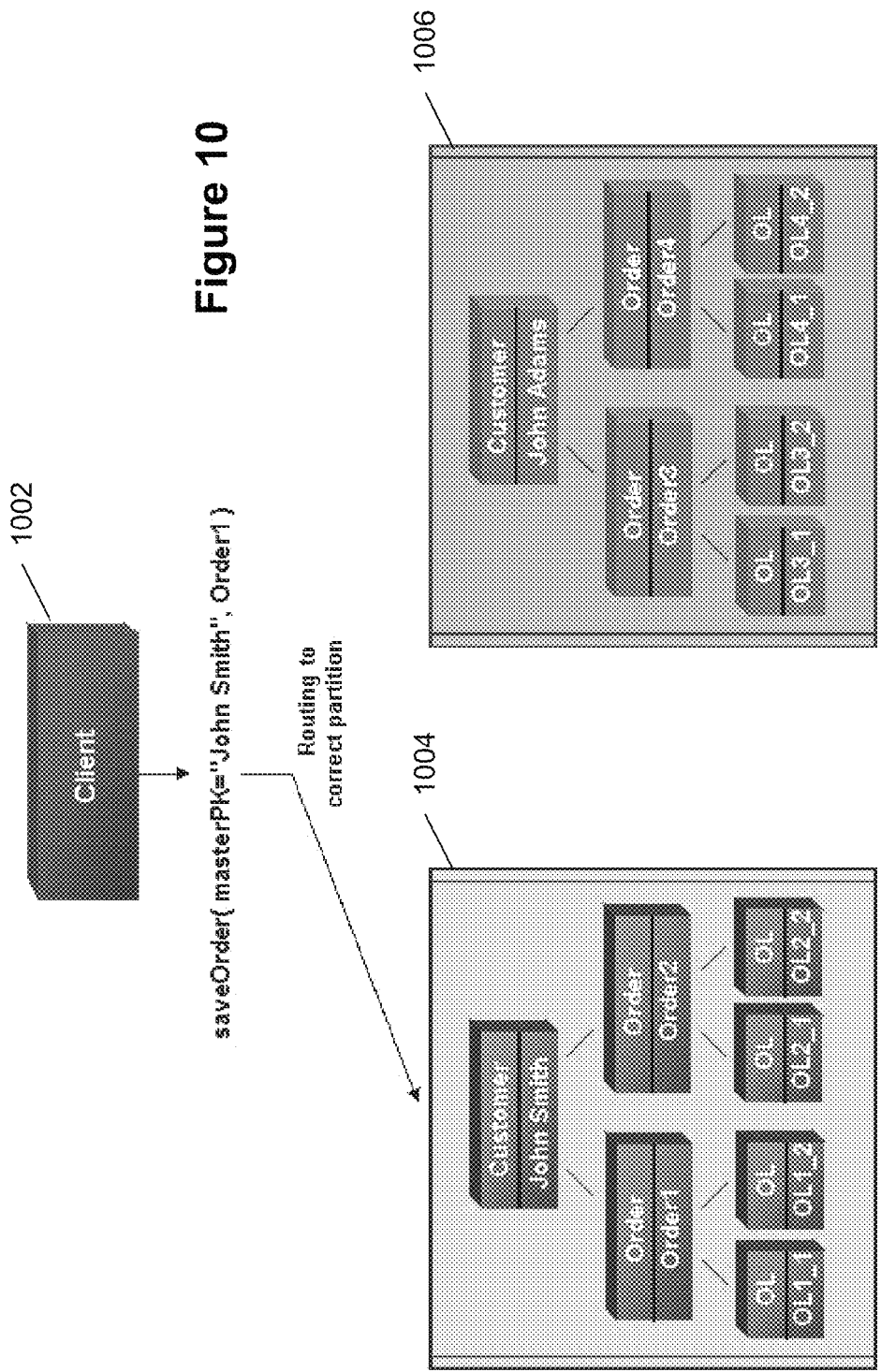
FIG. 10 illustrates partitioning of data.

Grouping of entities and partitioning is illustrated in FIG. 10. The diagram shows a data set partitioned into two partitions (stored in managed data areas of respective nodes). "Customer" is the master entity of the entity group; non-master entities in the group are referred to as subordinate entities. Customer "John Smith" and all subordinate entity instances (orders, order lines) are collected in a first partition 1004; "John Adams" and all subordinate entity instances are located in a second partition 1006. The client 1002, to store a new order for customer John Smith, needs to direct the information to the managed data area (or partition) 1004 where John Smith's live entities are stored. This is done by including the master entity's primary key in the call to the relevant service, e.g. a "SaveOrder" service (in real-world applications the primary key would typically be a unique customer ID rather than a name).

The grouping that is used will depend on the application context. It should be noted that use of the master entity's key as an explicit parameter in the service call means that the design of the service API can in some cases depend on the entity grouping used. Furthermore design of the entity groups can be constrained by the fact that a given instance of a subordinate entity can only be in one partition, so a given subordinate entity instance should preferably be uniquely associated with a master entity instance (so that it is possible to uniquely determine the master entity instance from the subordinate).

An appropriate division of a data model into entity groups can be based on relationships defined in an entity relationship model (or other high-level data definition).

Figure 11:
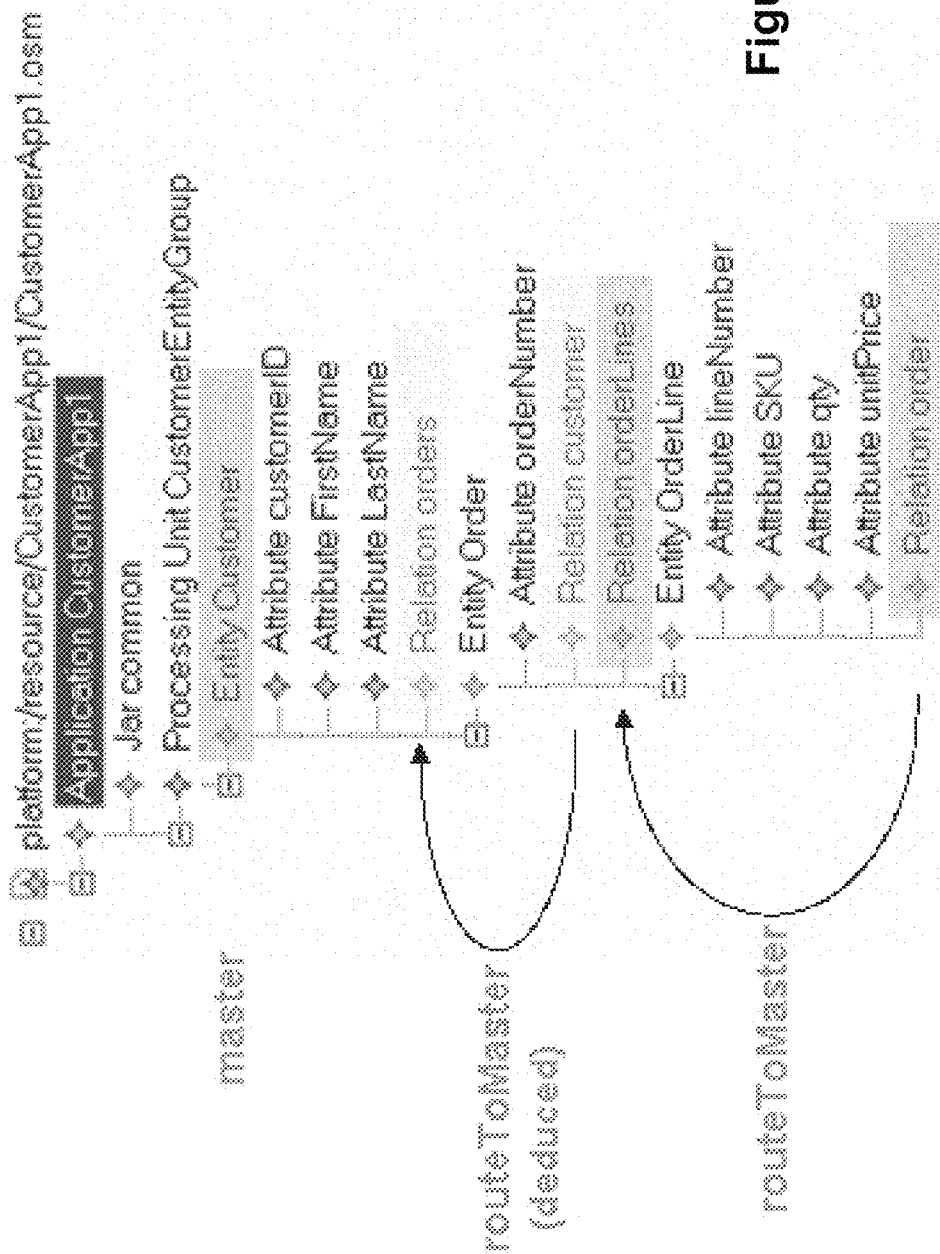
FIG. 11 illustrates a hierarchy of data entities.

This may involve considering relations defined in the ERM; to allow grouping there should preferably be a route using only 'to-1' relations from the subordinate entity to the master entity. This is illustrated in FIG. 11, which shows a hierarchical definition of entities. The route to the master can often be deduced, if there is only one "to-1" relation from a subordinate entity (like orders/customers in FIG. 11) to the master entity for an entity group.

Note that we are denoting the master-subsidiary relationship by nesting: the "Order" entity being nested underneath the "Customer" entity means that "Order" is subsidiary to "Customer". Similarly "OrderLine" is nested beneath "Order", so "OrderLine" is subsidiary to "Order", even though "Order" is not itself the master entity. A master entity—"Customer" in this case—should not be nested beneath another entity.

Figure 12:
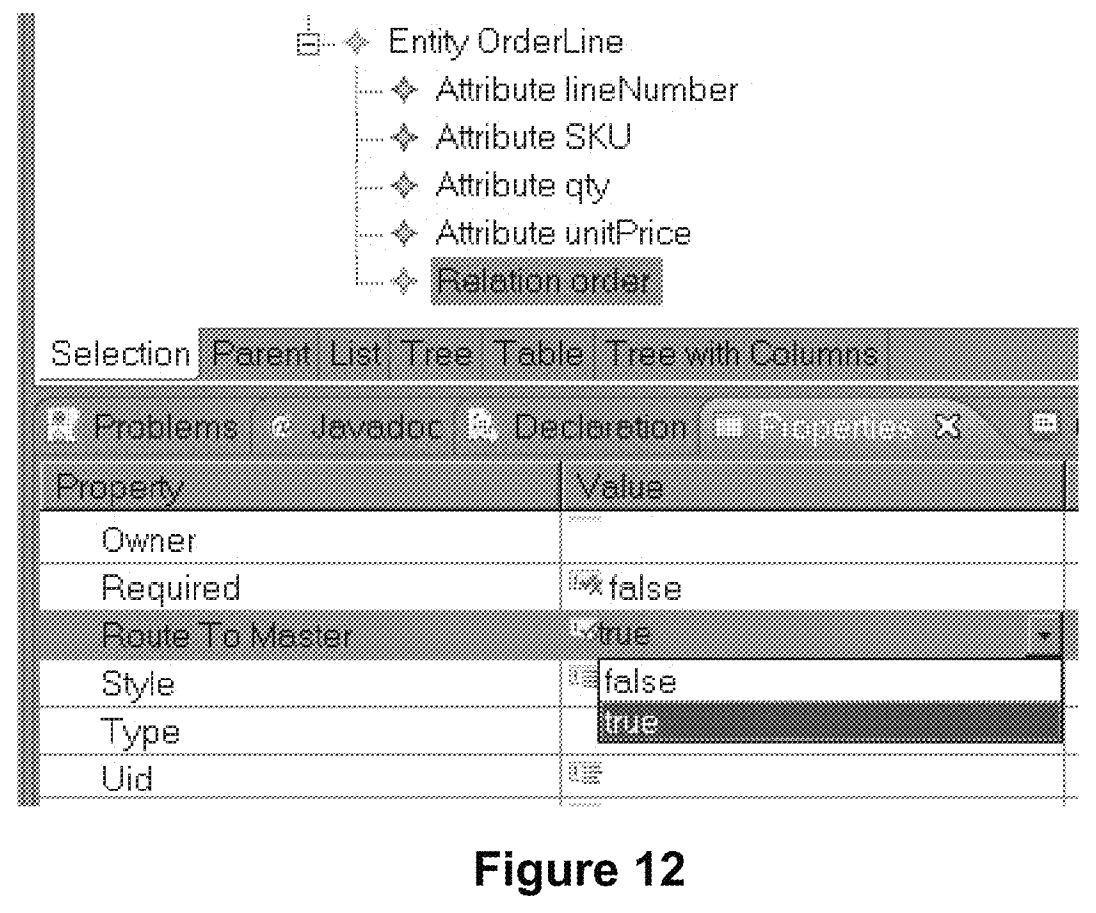

If there is more than one to-1 relation, or if this is not a direct subordinate of the master (like "orderLines"/"order" in the diagram), then the "to-one" end of the relation can be tagged as "routeToMaster". This is shown on the OrderLine entity's "order" relation, as illustrated in the user interface fragment shown in FIG. 12.

In this way, we can build, explicitly or implicitly, an unambiguous way of identifying the single master entity instance for each instance of a subsidiary entity.

If it is not possible to identify a route through "to-1" relations from a subsidiary to a proposed master entity, this indicates that the entities cannot be grouped in the proposed way, because it will not be possible to unambiguously identify the single master instance for any given instance of the subsidiary entity.

Figure 13:
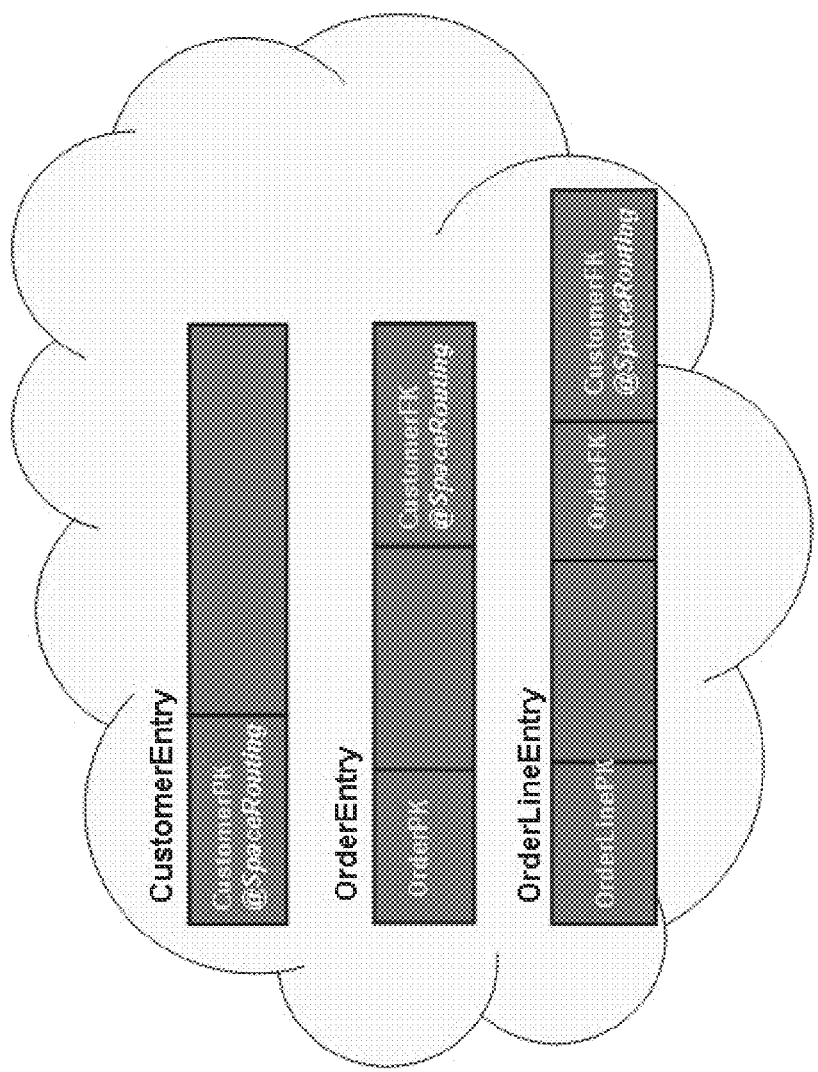
FIG. 13 illustrates a group of entities identified by a routing key.

To ensure that an object goes into the correct space, the "Customer" primary key should preferably be provided as a foreign key on the "OrderLine" entity as well as on the "Order" entity. This key can then be used as the "routingValue", for routing a service call or data access to the correct partition (or "space"). The resulting entity group is illustrated in FIG. 13 (this uses the GigaSpaces term "SpaceRouting" in place of "routingValue").

CloudSave Architecture

Figure 14:
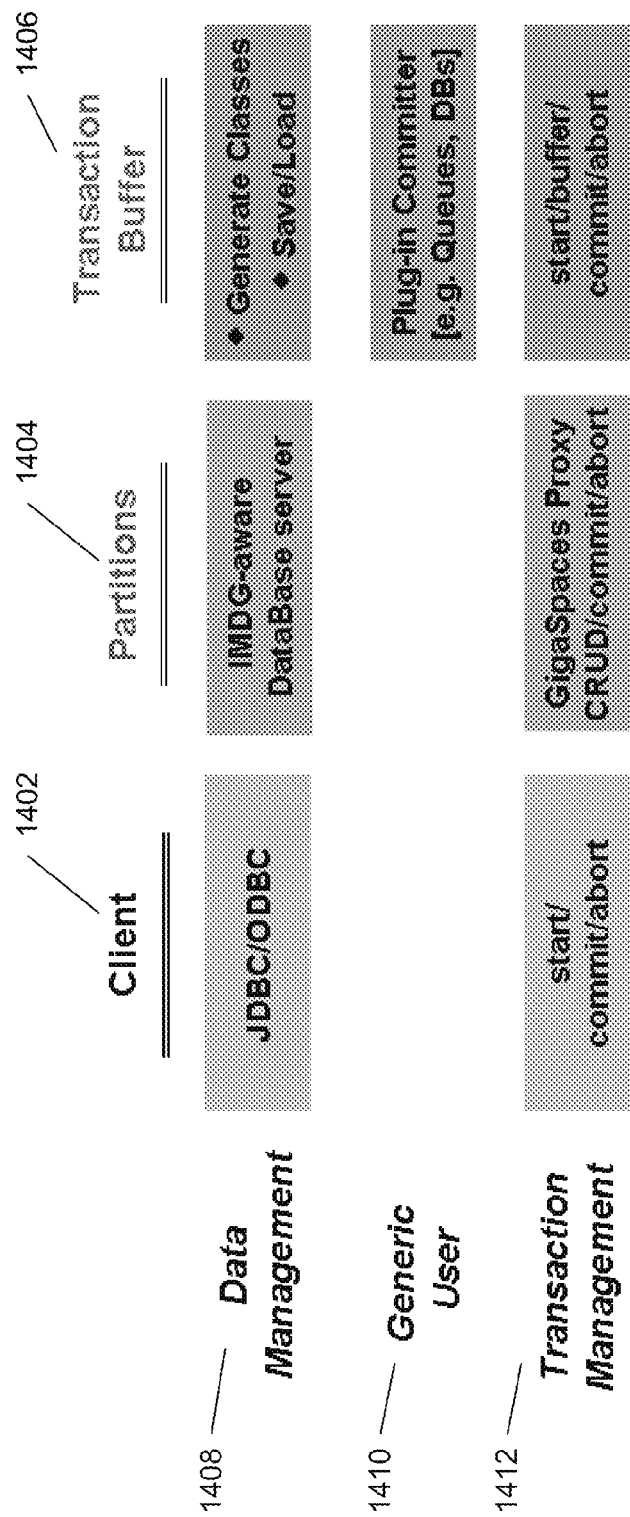
FIG. 14 illustrates the architectural layers of an implementation of the distributed transaction processing system.

FIG. 14 illustrates the overall architecture of CloudSave. The architecture comprises the client 1402, partitions (or grid nodes) 1404 and the transaction buffer 1406. The software architecture can be divided into three layers, Data Management layer 1408, Generic User layer 1410 and Transaction Management layer 1412.

The Transaction Management layer has been described above. The "Generic User" layer is dependent on the Transaction Management layer. The "Plug-in Committer" in the Transaction Buffer indicates that different actions can be taken dependent on the classes holding the records in the transaction. For example, classes representing queues can in general be ignored by the committer object because their action has already occurred. Inbound queue "messages" will be taken from the managed data area by the transaction. Outbound messages will be committed to the managed data area; their existence can then trigger event handlers to send them to the external data sink. Records representing database rows can cause them to be written to a database; the data source used to write the information is defined in the configuration information for each database table.

The Data Management layer is concerned with adapting the system for presentation as an in-memory database. The Client is preferably presented as a JDBC or ODBC (or ADO. NET) driver, depending on the preferred plug-in approach in the language platform. This means that users of higher-level APIs, such as JPA or Hibernate on the Java platform, can use the in-memory database without recoding their application. To make this possible, a "database server" can be provided that can use the data grid as the persistent data area rather than files on disk.

Alternatively, an object-relational mapping layer in Cloud-Save can provide a 'native' API that will be specific to Cloud-Save and faster to run.

The classes used to represent data records in the transaction buffer are preferably generated at start-up to match the database. This guarantees that the representation will be correct, and is therefore preferable to handwritten classes. CloudSave also loads the database into the IMDG at start-up or after downtime.

Distributed Transaction Processing in Other Contexts

The transaction processing aspects described above can also be used in other contexts. For example, although most of the discussion about transactions has been from the point of view of supporting and persisting IMDG operations in a service-oriented architecture, CloudSave transactions can also be used with other application architectures, for example message-based architectures (e.g. to model the message-based transmission of information into and out of a node). This section explains how this can be achieved.

The CloudSave transaction manager records transactions as collections of basic operations on the managed data area, i.e. creating, updating or deleting. When operating as an IMDG, data is read and written to the managed data area by transactions, for example using create, update and delete, as described above. The managed data area is the source and sink of IMDG data.

When operating as a general-purpose execution environment, external inputs are represented as records that are written to the managed data area. These can then
- trigger methods via event handlers
- be deleted from the managed data area to simulate destructive reading from the queue.

Similarly, outputs to external systems are represented as records that are created in the managed data area to simulate writing to a queue.

The CloudSave transaction operates by proxying the create, update and delete operations. This means that the external inputs and outputs (e.g. Web Service calls, J2EE Java Messaging Service (JMS)) can be made part of a distributed transaction simply by using the specialised proxy. A typical scenario for this is:
- event handler method called when new message arrives
- the event handler starts the distributed transaction, acting as 'client'
- the event handler removes the original message from the space (under the transaction)
- database work is done to the IMDG, creating other operations as part of the distributed transaction
- the result is computed and one or more output objects are created in a managed data area under the same transaction
- the distributed transaction is committed, with the result that the data operations in the managed data area are committed at once
- after committing, event handlers are triggered to remove the output messages and place them on output queues.

This covers removing the input message, committing the output messages and IMDG changes.

Federated Applications

Where multiple disparate applications cooperate in a transaction, those applications (which may be provided by different service providers) may be arranged to share a single transaction buffer (a federated transaction buffer) and associated buffer manager. In that case, each application may perform its own processing using (physically separate) servers or server grids, but processing results are transmitted to the common transaction buffer manager. The applications may use a single shared business transaction identifier which can be mapped to the CloudSave internal transaction identifier. The persistence layer at the transaction buffer manager may then persist the changes as described above, but to separate persistence databases associated with the respective applications.

Figure 15:
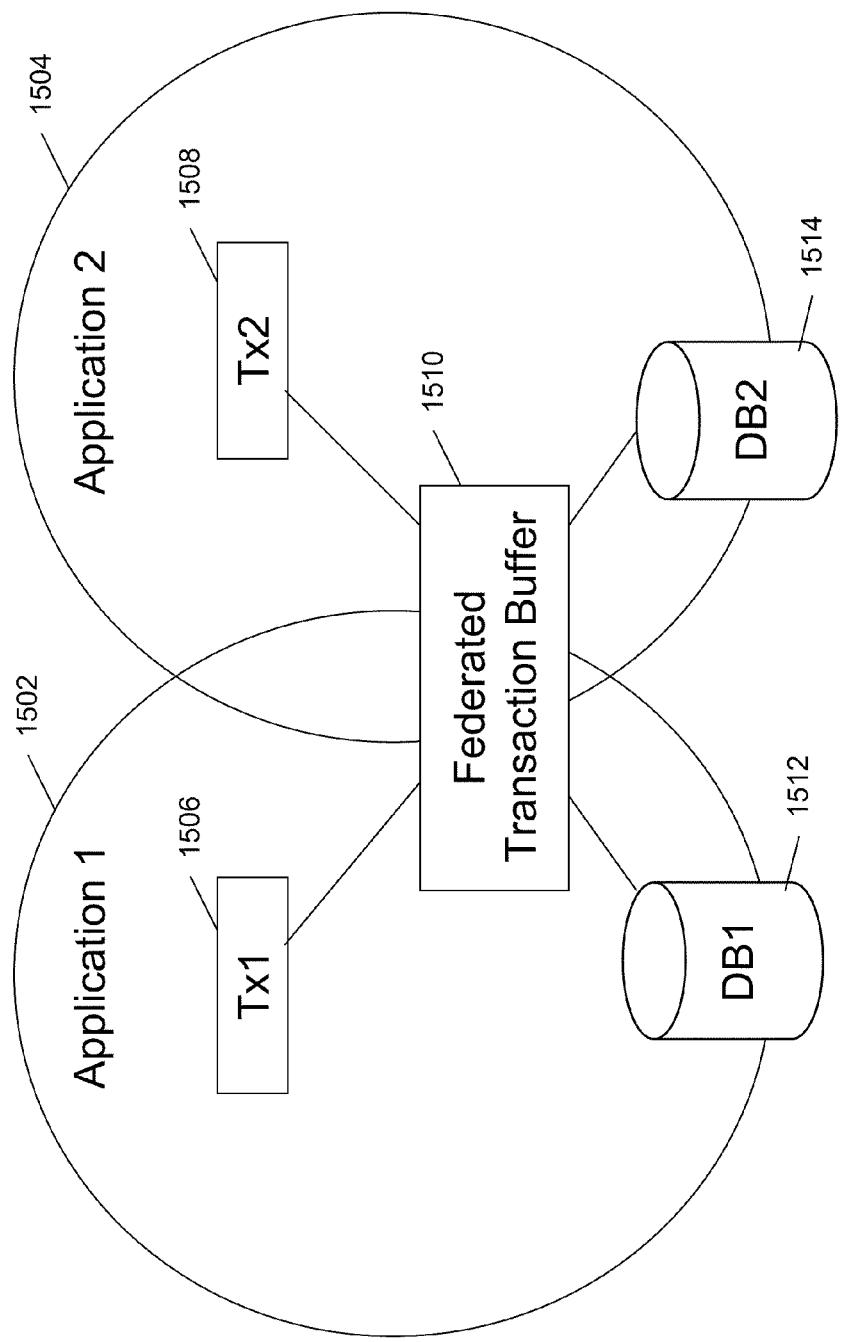
FIG. 15 illustrates multiple applications cooperating using a shared transaction buffer manager.

This is illustrated in FIG. 15, which shows two applications 1502 and 1504 cooperating in a cooperative transaction involving individual transactions 1506 and 1508. The shared transaction buffer 1510 is used to manage transaction state as described before. Application data changes are persisted to databases 1512 and 1514 associated with the respective applications.

As an example, the first application may be a holiday booking system, and the second application may be a flight booking system. Booking of a holiday includes booking a flight, and so the holiday booking system cooperates with the flight booking system, with the transaction buffer manager ensuring that the cooperative transaction is managed as a whole (and so commits or aborts as a whole) and that changes are persisted to the different systems' databases after the transaction has been committed.

Implementation Details

The following describes details of the implementation of representative elements of the system. Java is used for this implementation and so elements are illustrated using Java syntax, but other programming languages and programming/execution environments may alternatively be used.

In the following, "TxB" refers to the transaction buffer managed by the transaction buffer manager and "DTx" refers to the distributed transaction. The term "space" refers to a managed data area at a cohort or transaction buffer manager.

The implementation includes various data structures and APIs (application programming interfaces). All calls to the APIs preferably fail by throwing an exception. Where relevant, default values are given in parentheses.

Configuration information for the system includes for each application the URL or routing information to access the transaction buffer space, and for each persistent data storage medium used for persisting data, a "persistenceAdapterClass", which is the name of the class used to persist transactions (e.g. to JDBC/database)

Data Structures

Transaction information is stored using class "DistributedTxInfo". An object of this class is passed into the TxB.start( ) call (described below), filled in by TxB, then passed into Cohort.enrol( ):

```
class DistributedTxInfo
{
    String bizTxId;
        // the business transaction identifier (no default)
    Integer timeout1;
        // overall DTx timeout, enforced by TxB (30 seconds)
    Integer timeout2;
        // time a cohort waits before checking on DTx status (15 seconds)
    Long internalTxId;
        // internal transaction ID (unique ID generated)
    Enum Status {ACTIVE, COMMITTING, COMMITTED, ABORTING, ABORTED}
        status;
    enum   PersistenceStatus   {WAITING_FOR_DEPENDENTS, OK_TO_PERSIST,
        PERSISTING, PERSISTED } ps; // for internal use only
```

```
RoutingEntry cohortsToNotifyArray[ ] = null;
    // initialised from list of CohortFlushInfo's of DTx
}
```

Information at a cohort for a subtransaction is managed using the "SubTransactionInfo" class:

```
public class SubTransactionInfo
{
    enum SpaceOperation { WRITE, UPDATE, DELETE };
    enum SqlOperation { CREATE, UPDATE, DELETE };
    SpaceOperation spaceOperation;
        // the GigaSpaces view of what happened in this operation
    SqlOperation sqlOperation;
        // the SQL view of what happened
    Object spaceObject;
        // the object that is created/updated/deleted in the space
}
```

A "TransactionInfoForPersistor" object is created by the TxBufferManager to contain all the log/persistence information in one place:

```
class TransactionInfoForPersistor
{
    DistributedTxInfo distTxInfo;
    SubTransactionInfo[ ] subTransactions;
        // The array of subTransactions (one per group)
}
```

A "CohortFlushInfo" object is written from the cohort to the TxBufferManager's space to flush the current changes (i.e. the changes to the managed data area of the cohort):

```
class CohortFlushInfo
{
    Long commitOrderNumber;
        // provides order of CohortFlushInfo's from a given
        Cohort
    SubTransactionInfo[ ] spaceActionsList;
        // all the subtransactions written in this group
    RoutingEntry routingEntry;
        // routes callbacks to the sending Cohort partition
}
```

A "RoutingEntry" object is used to enable information to be routed from the TxBufferManager back to the Cohort

```
class RoutingEntry
{
    Integer n;
}
```

APIs

The following describes various API function calls used in the system:

Client to TxBufferManager:
DistributedTxInfo start(DistributedTxInfo)
Starts the distributed transaction.
Allocates internalTxId if necessary.
Writes DistributedTxInfo into space, status=ACTIVE.
void commit(DistributedTxInfo)
Commits the DTx unless previously aborted by cohort.
Updates DistributedTxInfo in space to COMMITTING
fills in the DistributedTxInfo.cohortsToNotifyArray with the list of RoutingEntry objects,
creates a TransactionInfoForPersistor object and aggregates subtransactions from all the CohortFlushInfo objects for this DTx into the TransactionInfoForPersistor.subTransactions
then sends the TransactionInfoForPersistor object to the log and persist queues and the DistributedTxInfo to the log.
void abort(DistributedTxInfo)
Aborts the DTx unless previously aborted by cohort.
Updates DistributedTxInfo in space to ABORTIING and adds the DTx to the commit/abort queue.
Service Application to Cohort:
CohortSubTxProxy enrol(DistributedTxInfo distTxAttrs)
Returns a proxy for space operations, which implements all the org.openspaces.core.GigaSpace API.
The DistributedTxAttrs is as returned from TxBufferManager.start( ).
This writes a SubTransactionStatusEntry record into the local space with status=ACTIVE.
flush(DistributedTxInfo distTxInfo)
Flushes the changes for this service thread.
As described above, if it is the "last man out", this writes the changed records to date in a CohortFlushInfo object directly into the TxB's space.
This is done under a local transaction for the local space; the local transaction remains uncommitted.
abort(DistributedTxInfo distTxInfo)
Aborts the complete transaction.
Updates the SubTransactionStatusEntry in the local space and
calls abortFromCohort on the TxB, which guarantees the DTx will abort.
TxBufferManager to Cohort:
void commitDistributedTx(RoutingEntry, internalTxId);
the TxBufferCommitOrAbortThread calls this for the cohort to commit its local transaction and update its DistributedTxInfo.Status to COMMITTED.
Resources in the cohort for the distributed and local transactions can be released.
void abortDistributedTx(RoutingEntry, internalTxId);
tells the cohort to abort its local transaction
This is a synchronous call.
When it completes without exception the TxBufferManager notes that this cohort has aborted.
When all cohorts have aborted, the TxBufferManager sets the DistributedTxInfo status to ABORTED.
Cohort to TxBufferManager:
txAbortedByCohort(internalTxId);
the service application has instructed the cohort to abort. The TxB carries out the processing as for abort( ) above
updates the DistributedTxInfo to ABORTING and
adds the DTx to the commit/abort queue.
DistributedTxInfo.Status getTransactionStatus(internalTxId)
used by the cohort in processing its timeout2 action to see if the transaction is still ACTIVE.
the TxBufferManager retrieves the DistributedTxInfo from the space and returns its status entry.
TransactionInfoForPersistor getTransactionStatusAndFlushInfo(internalTxId);
used by the cohort on becoming primary to discover the state of ACTIVE transactions in its local space in order to abandon them (if they are aborting at the space) or recreate them (if they are ACTIVE or COMMITTING), in which case the returned object also contains SubTransactionInfo Queues and Processing Threads The following queue data structures are used:

| | | |
|---|---|---|
| TxBufferManager | logQueue[TransactionInfoForPersistor]: | class |
| TxBufferLogThread | | |

There is a single TxBufferLogThread. This queue is managed by a single thread; transactions are written out to a file named <dir>/internalTxId in order of arrival.

TxBufferManager persistQueue [Transaction InfoForPersistor]:

class TxBufferPersistThread

Transactions are selected for processing as described above.

TxBufferManager commitOrAbortQueue[DistributedTxInfo]:

class TxBufferCommitOrAbortThread

This processes transactions that have been moved into COMMITTING or ABORTING state. It can be multi-threaded but to preserve ordering of transaction changes, a second commit instruction is not sent to a cohort if a first one is being processed.

It sends the commit/abortDistributedTx( ) command to all the cohorts synchronously and if the command completes normally, removes the cohort's routing entry from the cohortsToNotifyArray.

Once all cohorts have been informed, if the cohortsToNotifyArray is empty, the program removes the DistributedTxInfo from the queue and updates the status to COMMITTED OR ABORTED in the space, as appropriate; if not, the program notes that it must process this DistributedTxInfo later (after the slow timeout described previously).

The above description gives an example of APIs and data structures that may be used in implementing the described distributed transaction processing system. For the sake of clarity, only representative aspects of the implementation have been described. Many other implementations are of course possible.

Code Generation

In preferred embodiments, the system includes code generation facilities for generating parts of an application's code. The code is preferably generated based on a data/application model. The generated code may include code for handling data in the data grid, invoking processing in the data grid, and interacting with the transaction processing system, including with the transaction buffer manager. By using code generation from a model, applications can be built more quickly and reliably, and correct implementation of the transaction management features can be ensured. Code generation may use or be based on the JeeWiz code generation system and related products available from New Technology/enterprise Ltd, United Kingdom, aspects of which are described in U.S. patent application Ser. No. 11/788,824 (publication no. US 2008/0082959), the entire contents of which are incorporated herein by reference.

CloudSave and GigaSpaces XAP

A goal of CloudSave is to make it as easy as possible for Java developers to write mission-critical applications that are scalable and fast. In preferred embodiments, CloudSave is layered on top of GigaSpaces XAP. CloudSave can add the following features over GigaSpaces.

Coordinating Data Grid and Storage Services

GigaSpaces transactions coordinate operations in one space or between spaces, and it has a mirror service that does asynchronous write-behind to a database. Though adequate for simple situations, for multi-database, multi-space operations it does not preserve atomicity or consistency between the spaces and the data storage services.

CloudSave can provide solid ACID transactionality that coordinates operations between the data grid and storage services, without limiting the speed by disk writes. This means that developers using rich domain models spread across different data stores can use transactions without worrying about whether the particular deployment configuration can handle it.

Object-Space-Relational Mapping

Java developers are used to working with an object view, where relations between objects are held as object references. But in a scalable, cloud-based system, objects are distributed across different machines and object references aren't possible. Instead, the relation must use an identifier—like a foreign key—that can be used to simulate an object reference by doing a lookup and fetch under the covers. This means that there need to be different types of objects: one used by Java developers in their application, having object references; and another stored in the space with foreign keys in place of the object references.

As if that wasn't enough, backing up Java space objects to a SQL database requires the usual object-relational mapping. The code has to load objects from the database into memory, as well as saving updates from memory to the persistent store.

In other words, there are three different views of information that need format definitions and mapping operations between them. In preferred embodiments, CloudSave generates code (as described above) to make sure this is all done correctly: JDBC is supported out of the box; other types of persistent stores can be mapped via plug-ins.

Automatic Configuration and Deployment

GigaSpaces XAP is an application server-level product. This means it has more features than just a caching product, but it needs to be configured and deployed. The down side is the developer has to do configuration, deployments etc. This requires a lot of investment in learning configuration and deployment concepts and increases cost and risk from getting it wrong.

CloudSave can provide modelling and code generation to help developers get over this hump. Modelling is via an Eclipse plugin which uses terms that developers can readily understand—entities, data sources, services and queue receivers/topic subscribers. Then the code generation makes it easy to convert the model into a production system—just add business logic.

Developers can also model multiple deployments, tied to the application model. In preferred embodiments, the default deployment is to the Eclipse UI, but Windows, Linux and Amazon EC2 are supported. Other deployment target environments may be supported. It can be useful to be able to model deployments for different purposes (such as Dev, Test, UAT and Live) strictly driven by the application model—it avoids introduction of errors when reworking the configuration by hand when the application changes.

CloudSave Technical Overview

The following gives a summary overview of technical features available in some embodiments of the CloudSave system.

CloudSave is an architectural solution for building scalable, data-oriented mission-critical applications in the cloud using Java.

Common application architectures like Enterprise Java or Ruby on Rails do not scale well beyond a handful of machines. A successful application starts by using a database to store data, then improves performance and scalability by caching everything possible, and finally migrates away from standard architectures to an in-memory data grid/cloud.

Cloud technologies provide the infrastructure for scalability and provide many new options in this area—commercial, technical and architectural. If you are interested in building applications to support thousands or millions of users, how do you integrate these into a practical and performant architecture that will be good for the next decade? There are fundamental issues that should be addressed:

- the shifting economics between disk and memory-based solutions. In-memory solutions can now address datasets that used to require disks
- the scalability problems of conventional databases and the growth in specialised storage solutions in the cloud
- how to effectively deploy large numbers of machines to provide big data, high processing capabilities that make best use of multi-core CPUs
- the difficulty of providing transactions in distributed architectures, coordinating updates across machines and persistent stores
- how to scale up an application without rearchitecting CloudSave provides a software architecture that can solve or at least reduce these problems. Embodiments can comprise the following infrastructure components:

- Support for the in-memory data grid approach to data management. This provides automatic mapping of data, between Object view (for application programmers), grid view (data in the grid) and relational/persistent view. In other words, this is a generalisation of the ORM (Object-Relational Mapper) adapted for in-memory data grids.
- A plug-in framework to attach to different types of persistent stores. Support for databases via JDBC is provided.
- Easy-to-use support for the "Entity Group" pattern, which maximises locality of data references for optimal performance in large data applications
- Robust, fast transactionality for cloud environments, coordinating transactions that span multiple nodes in the cloud as well as multiple persistent stores.
- Application modelling via an Eclipse plug-in.

CloudSave can enable the developer to:
- deliver mission-critical read/write applications with millisecond response times
- use one architecture for any size of application, in the data center or cloud
- create non-stop applications that continue working when back-ends are down
- use different persistence products in a standard architecture
- reduce learning, proving and maintenance costs by using simple modelling.

It will be understood that the present invention has been described above purely by way of example, and modification of detail can be made within the scope of the invention.

The text of the abstract filed herewith is repeated here as part of the specification.

A system and method for processing a distributed transaction for an application are disclosed. Conventionally transactions on critical data (e.g. financial information) are processed using a database architecture whereby a persistent database (typically a redundant disk array) comprises the master record. In cases where large amounts of data need to be accessed but absolute data integrity is less critical, for example search engines, processing is conducted on live in-memory data without all the data being backed up, which can be much faster but data can be lost when processors fail. There have been attempts to use data grid architectures with some backup to persistent stores for more important data but these have either introduced disk access bottlenecks or required manual intervention in the event of failure. Aspects of the invention provide committal of distributed transactions independently of persistent storage which can make the speed advantages of data grid computing available for high volume distributed transactions, without losing the reliability of conventional database systems. The methods, systems and architecture are independent of the nature of the application or data.

The invention claimed is:

1. A method of processing a distributed transaction associated with an application, the application comprising application data stored in an in-memory data grid comprising a plurality of processing elements each having respective associated memory for storing a respective portion of the application data, the method comprising:

Initiating a distributed transaction by a client connected to the in-memory data grid;

executing the distributed transaction by processing elements of the in-memory data grid, the executing comprising performing processing at multiple processing elements of the grid, the processing resulting in changes to be made to application data stored in memory at each of a plurality of participating processing elements;

transmitting, from each of said plurality of participating processing elements, processing result information defining the changes to be made to the application data at the respective participating processing elements to a transaction manager during execution of the distributed transaction, the transaction manager storing transaction data enabling the state of the distributed transaction to be reconstructed at a processing element after an error occurring at the processing element during execution of the distributed transaction;

in response to an indication from the client received at the transaction manager, causing, by the transaction manager, the changes to be committed to the in-memory application data at the plurality of participating processing elements, whereby modified application data elements are made available for subsequent access by the application; and updating a copy of application data stored on a storage medium separate from the processing elements based on the processing result information received by the transaction manager.

2. A method according to claim 1, comprising reconstructing the state of the distributed transaction at a processing element of the plurality of processing elements, after an error at the processing element during execution of the distributed transaction, using information received from the transaction manager.

3. A method according to claim 2, wherein the reconstructing step comprises sending a status query from the processing element to the transaction manager, and receiving a status response indicating the status of the distributed transaction.

4. A method according to claim 3, wherein the information received from the transaction manager used in reconstructing the state of the distributed transaction comprises processing result information previously transmitted to the transaction manager by the processing element.

5. A method according to claim 4, wherein the status response includes the previously transmitted processing result information.

6. A method according to claim 4, comprising committing changes to the in-memory application data at the processing element based on the processing result information received from the transaction manager.

7. A method according to claim 2, wherein the reconstructing step further uses information backed up to a backup processing element associated with the processing element.

8. A method according to claim 1, wherein the error comprises non-receipt at the processing element of a commit or abort instruction from the transaction manager.

9. A method according to claim 1, wherein the error comprises a failure of the processing element, the reconstructing step comprising switching the processing for the processing element to a backup processing element, and reconstructing the state of the transaction at the backup processing element using one or more of:

transaction status information received from the transaction manager;

processing result information received from the transaction manager; and application state previously backed up to the backup processing element.

10. A method according to claim 1, wherein the processing result information is transmitted from respective processing elements before the changes are committed at the processing elements.

11. A method according to claim 1, wherein updating of the copy of application data and committing of changes at the processing elements occur independently and asynchronously.

12. A method according to claim 1, wherein the copy of application data is updated after committing the changes at the processing elements.

13. A method according to claim 1, comprising, in response to the commit indication received at the transaction manager from the client, transmitting a commit acknowledgement to the client, whereby the client treats the transaction as committed after receiving the commit acknowledgement.

14. A method according to claim 13, wherein the transmission of the acknowledgement occurs asynchronously with one or both of the committing of changes at the processing elements and the updating of the copy of application data at the separate storage medium.

15. A method according to claim 1, wherein the updating step preserves transaction isolation.

16. A method according to claim 1, wherein the updating step comprises identifying dependencies between sets of processing results associated with respective distributed transactions, and processing the sets of processing results in an order based on identified dependencies.

17. A method according to claim 1, wherein the step of causing changes to be committed at the processing elements is performed after transmitting processing result information from the processing elements.

18. A method according to claim 1, wherein the updating step comprises updating a persistent copy of application data on one or more persistent storage media based on the processing result information associated with the distributed transaction.

19. A persistent computer readable medium comprising software code adapted, when executed on a data processing apparatus, to perform a method as claimed in claim 1.

20. A method of processing a distributed transaction associated with an application, the application comprising application data stored in an in-memory data grid comprising a plurality of processing elements each having respective associated memory for storing a respective portion of the application data, the method comprising:

initiating a distributed transaction by a client connected to the in-memory data grid;

executing the distributed transaction by processing elements of the in-memory data grid, the executing comprising performing processing at multiple processing elements of the grid, the processing resulting in changes to be made to application data stored in memory at each of a plurality of participating processing elements;

transmitting, from each of said plurality of participating processing elements, processing result information defining the changes to be made to the application data at the respective participating processing elements to a transaction manager;

in response to an indication from the client received at the transaction manager, causing, by the transaction manager, the changes to be committed to the in-memory application data at the plurality of participating processing elements, whereby modified application data elements are made available for subsequent access by the application; and asynchronously with the committing step, updating a copy of application data stored on a storage medium separate from the processing elements based on the processing result information received by the transaction manager.

21. A method according to claim 20, comprising transmitting an acknowledgement to the client that the distributed transaction is being committed asynchronously with and prior to, one or both of the committing step and the updating step.

22. A method according to claim 20, wherein the copy is updated after the changes are committed at the processing elements.

23. A method according to claim 20, wherein the changes made to application data at processing elements comprise first changes to one or more data elements stored in memory at the processing elements, the method comprising executing a subsequent transaction involving second changes to one or more of the previously modified data elements prior to updating the separate storage medium based on the first changes.

24. A method according to claim 20, wherein the processing result information is transmitted before the changes are committed at the processing elements.

25. A method according to claim 20, comprising collecting processing results relating to multiple calls to a processing element during the distributed transaction, and transmitting the collected processing results to the transaction manager as a group.

26. A method according to claim 20, comprising transmitting a registration message from a processing element to the transaction manager, and registering the processing element as a participant in the distributed transaction at the transaction manager in response to the message.

27. A method according to claim 26, comprising, in response to a commit instruction received at the transaction manager, transmitting a commit message to each processing element registered at the transaction manager as a participant in the distributed transaction.

28. A method according to claim 20, comprising storing the processing results received from processing elements in a buffer associated with the transaction manager.

29. A method according to claim 28, wherein the buffer is held in memory associated with the transaction manager.

30. A method according to claim 28, comprising updating the separate storage medium based on information stored in the buffer.

31. A method according to claim 20, comprising, after receiving at the transaction manager a notification from a processing element indicating that the processing element has recovered from a failure, transmitting processing results previously received from the processing element and stored in the buffer to the processing element.

32. A method according to claim 20, wherein one or more of the processing elements are each associated with a primary processing device and one or more backup processing devices.

33. A method according to claim 32, comprising, in response to failure of a primary processing device, switching processing for a processing element to an associated backup processing device, and transmitting a notification to the transaction manager indicating recovery from a failure.

34. A method according to claim 20, wherein performing processing at a processing element comprises executing a local transaction at the processing element, and committing the local transaction in response to a commit message received from the transaction manager.

35. A method according to claim 20, comprising querying the transaction manager by a processing element to determine the distributed transaction status if no commit or abort message is received within a specified time limit, and transmitting a commit or abort message to the processing element in response to the query.

36. A method according to claim 20, wherein each processing element comprises:
  a managed data area for storing application data; and
  code for performing processing using data stored in the managed data area.

37. A method according to claim 36, wherein code stored at processing elements implements one or more services in a service-oriented architecture.

38. A method according to claim 36, wherein code stored at processing elements implements a messaging or event-driven application interface.

39. A method according to claim 36, comprising backing up the managed data area to one or more backup processing elements, wherein the backup is updated when a local transaction is committed.

40. A method according to claim 20, wherein the processing elements are software processing elements comprising virtual machines arranged to run on processing devices.

41. A method according to claim 40, comprising assigning two or more software processing elements to a processing device.

42. A method according to claim 40, comprising, in response to a change in processing load at one or more processing devices, modifying the assignment of software processing elements to processing devices.

43. A method according to claim 20, comprising partitioning the application data across different processing elements based on content of the data.

44. A method according to claim 43, comprising grouping entities in the application data based on relationships between the entities and/or based on application functionality associated with the entities, and assigning different entity groups to different processing elements.

45. A method according to claim 20, comprising selecting a data field associated with a data entity in the application data as a key; partitioning the application data into partitions based on values of the key; and assigning data partitions to processing elements of the data grid.

46. A method according to claim 45, comprising routing a data access request or service call specifying a key value to one of a plurality of processing elements in dependence on the key value.

47. A method according to claim 45 wherein the key is associated with a group of related entities.

48. A method according to claim 20, wherein updating the separate storage medium comprises processing the sets of processing results by a plurality of concurrent update processes, the method further comprising identifying dependencies between sets of processing results stored in the buffer of the transaction manager, and processing the sets of processing results by the plurality of concurrent update processes in an order based on identified dependencies.

49. A persistent computer readable medium comprising software code adapted, when executed on a data processing apparatus, to perform a method as claimed in claim 20.

50. A method according to claim 20, wherein the updating step comprises updating a persistent copy of application data on one or more persistent storage media based on the processing result information associated with the distributed transaction.

51. A processing system comprising:
  an in-memory data grid comprising a plurality of processing elements each having respective associated memory for storing a respective portion of application data for an application and processing distributed transactions operating on the application data, the in-memory data grid arranged to execute a distributed transaction, the executing including performing processing at a plurality of participating processing elements of the grid, the processing resulting in application data changes to be made to application data stored in memory at each of the plurality of participating processing elements;
  a persistent data storage medium for persistently storing application data; and
  a transaction manager for managing the committing of the distributed transaction in the in-memory data grid in response to a commit instruction received at the transaction manager, the transaction manager configured to receive information specifying the application data changes being made at the plurality of participating processing elements of the in-memory data grid during processing of the distributed transaction by the application before the transaction is committed in the grid, to initiate committing the changes to the in-memory application data at the plurality of participating processing elements, whereby modified application data elements are made available for subsequent access by the application, and to update the persistent data storage medium with the application data changes based on the received information after the transaction is committed, wherein the transaction manager stores transaction data enabling the state of the distributed transaction to be reconstructed at a processing element after an error occurring at the processing element during execution of the distributed transaction.

52. A processing system comprising:
  a first data storage medium comprising an in-memory data grid for storing application data for an application, the in-memory data grid comprising a plurality of processing elements, each configured to store a portion of the application data in memory and to perform processing actions relating to the portion of the application data as part of distributed transactions;
  a second data storage medium for storing application data; and a transaction manager for managing distributed transactions executed by the application, wherein the transaction manager is configured to:

receive information from each of a plurality of processing elements participating in a distributed transaction specifying application data changes resulting from processing performed by the respective processing element; and commit the distributed transaction by a process including:
receiving a message instructing the transaction manager to commit the transaction; and
after receipt of the message, transmitting messages to each participating processing element to commit data changes to the respective processing element's in-memory application data;

wherein the transaction manager is further configured, after the transaction has been committed, to update the second data storage medium based on the received information specifying application data changes.

53. A processing system according to claim 52, wherein each processing element is configured to store a given portion of the application data allocated to the processing element, and wherein at least one processing element stores the allocated portion of data entirely in memory.

54. A processing system according to claim 52, wherein each processing element is configured to store a given portion of the application data allocated to the processing element, and wherein at least one processing element stores a subset of the allocated portion of data in memory.

55. A processing system according to claim 54, wherein the at least one processing element is configured to fetch required data not currently stored in memory into memory when access to the data is requested by the application and/or when data changes are to be committed at the processing element.

56. A system according to claim 52, wherein the second data storage medium is a persistent data storage medium.

57. A processing system comprising:
a first interface to a first data storage system, the first data storage system comprising an in-memory data grid for storing application data for an application, the in-memory data grid comprising a plurality of processing elements, each configured to store a portion of the application data in memory and to perform processing actions relating to the portion of the application data as part of distributed transactions;

a second interface to at least one second data storage system for storing application data; and a transaction manager for managing distributed transactions executed by the application, wherein the transaction manager is configured to:

receive change information from each of a plurality of processing elements of the in-memory data grid participating in a distributed transaction, the change information for each respective one of said plurality of processing elements specifying application data changes resulting from processing performed by the respective processing element; and in response to an indication to commit the transaction:
transmit messages to each of the plurality of participating processing elements to commit data changes to the respective processing element's in-memory application data; and
initiate updating a copy of application data stored in the at least one second data storage system, based on the change information received from the processing elements.

58. A system according to claim 57, wherein the transaction manager is configured to transmit information to a plurality of second storage systems to update application data stored in the plurality of second storage systems, based on the change information received from the processing elements relating to the distributed transaction.

59. A system according to claim 57, wherein the second data storage system comprises a persistent storage medium.

* * * * *